United States Patent
Kawasaki et al.

(10) Patent No.: US 9,532,335 B2
(45) Date of Patent: Dec. 27, 2016

(54) WIRELESS COMMUNICATION APPARATUS AND WIRELESS COMMUNICATION METHOD

(71) Applicant: FUJITSU LIMITED, Kawasaki-shi, Kanagawa (JP)

(72) Inventors: Yoshihiro Kawasaki, Kawasaki (JP); Yoshiaki Ohta, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 62 days.

(21) Appl. No.: 14/724,198

(22) Filed: May 28, 2015

(65) Prior Publication Data
US 2015/0264664 A1    Sep. 17, 2015

Related U.S. Application Data

(63) Continuation of application No. PCT/JP2012/008142, filed on Dec. 19, 2012.

(51) Int. Cl.
*H04W 72/04*    (2009.01)
*H04W 24/10*    (2009.01)
(Continued)

(52) U.S. Cl.
CPC ............. *H04W 72/04* (2013.01); *H04L 1/00* (2013.01); *H04W 24/10* (2013.01); *H04W 88/06* (2013.01); *H04W 88/10* (2013.01); *H04L 5/0057* (2013.01)

(58) Field of Classification Search
CPC ...... H04W 24/10; H04W 72/04; H04W 88/10; H04W 88/06; H04L 1/00; H04L 5/0057
See application file for complete search history.

(56) References Cited

U.S. PATENT DOCUMENTS

2009/0316626 A1    12/2009    Lee et al.
2011/0013719 A1    1/2011    Taoka et al.
(Continued)

FOREIGN PATENT DOCUMENTS

JP    8-167872 A    6/1996
JP    2009-164975 A    7/2009
(Continued)

OTHER PUBLICATIONS

Extended European search report with the supplementary European search report and the European search opinion issued for corresponding European Application No. 12890234.3 issued on Nov. 30, 2015.
(Continued)

*Primary Examiner* — Brian D Nguyen
(74) *Attorney, Agent, or Firm* — Myers Wolin, LLC

(57) ABSTRACT

A wireless communication apparatus that performs transmission based on a radio resource that is allocated from another wireless communication apparatus, the wireless communication apparatus including: a memory, and a processor coupled to the memory and configured to, after a first radio resource for transmitting first information has been allocated, before transmitting the first information based on the first radio resource, when a second radio resource is allocated that is a radio resource of a timing different from a timing of the first radio resource and is a radio resource for transmitting second information, perform a transmission process of transmitting the first information and the second information based on the second radio resource and of not using the first radio resource for the transmission.

14 Claims, 14 Drawing Sheets

(51) Int. Cl.
*H04W 88/06* (2009.01)
*H04W 88/10* (2009.01)
*H04L 1/00* (2006.01)
*H04L 5/00* (2006.01)

(56) References Cited

U.S. PATENT DOCUMENTS

| | | | | |
|---|---|---|---|---|
| 2011/0242969 | A1* | 10/2011 | Dayal | H04W 36/0055 370/225 |
| 2011/0243094 | A1* | 10/2011 | Dayal | H04W 16/14 370/331 |
| 2011/0256834 | A1* | 10/2011 | Dayal | H04W 16/14 455/67.7 |
| 2011/0312282 | A1* | 12/2011 | Prather | H04B 17/00 455/67.13 |
| 2012/0051321 | A1* | 3/2012 | De | H04W 36/0011 370/331 |
| 2012/0164948 | A1* | 6/2012 | Narasimha | H04W 72/1215 455/63.1 |
| 2012/0264421 | A1* | 10/2012 | Liu | H04W 88/04 455/426.1 |
| 2013/0028207 | A1 | 1/2013 | Okubo et al. | |
| 2013/0044711 | A1 | 2/2013 | Aiba et al. | |

FOREIGN PATENT DOCUMENTS

| | | |
|---|---|---|
| JP | 2011-523263 A | 8/2011 |
| JP | 2011-171837 A | 9/2011 |
| JP | 2012-65126 A | 3/2012 |
| WO | 2011/115199 A1 | 9/2011 |
| WO | 2012/021879 A2 | 2/2012 |

OTHER PUBLICATIONS

3rd Generation Partnership Project (3GPP) RAN WG1, "Reply LS on CQI feedback", R2-072873, 3GPP TSG-RAN WG2 Meeting #58bis, 3GPP, Orlando, FL (US), Jun. 25-29, 2007.

Ericsson et al., "SRS and DRX", R2-110954, 3GPP TSG-RAN WG2 Meeting #73, 3rd Generation Partnership Project (3GPP), Taipei, Taiwan, Feb. 21-25, 2011.

3GPP TR 36.816 V11.2.0, 3rd Generation Partnership Project; Technical Specification Group Radio Access Network; Evolved Universal Terrestrial Radio Access (E-UTRA); "Study on signalling and procedure for interference avoidance for in-device coexistence (Release 11)", Dec. 2011. [Cited in ISR for PCT/JP2012/008142].

3GPP TS 36.213 V11.0.0, 3rd Generation Partnership Project; Technical Specification Group Radio Access Network; Evolved Universal Terrestrial Radio Access (E-UTRA); "Physical layer procedures (Release 11)", Sep. 2012. [Cited in ISR for PCT/JP2012/008142].

3GPP TS 36.331 V11.1.0, 3rd Generation Partnership Project; Technical Specification Group Radio Access Network; Evolved Universal Terrestrial Radio Access (E-UTRA); Radio Resource Control (RRC); "Protocol specification (Release 11)", Sep. 2012.

CMCC et al., Change Request for "Stage-2 CR on signalling and procedure for interference avoidance for IDC", 3GPP TSG-RAN WG2 Meeting #78, R2-123111, Prague, Czech Republic, May 21-25, 2012.

3GPP TS 36.300 V11.3.0, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; "Stage 2 (Release 11)", Sep. 2012. [Cited in ISR for PCT/JP2012/008142].

International Search Report issued for corresponding International Patent Application No. PCT/JP2012/008142, mailed Feb. 12, 2013, with a partial English translation.

* cited by examiner

WIRELESS COMMUNICATION APPARATUS AND WIRELESS COMMUNICATION METHOD

CROSS-REFERENCE TO RELATED APPLICATION

This application is a continuation application of International Application PCT/JP2012/008142 filed on Dec. 19, 2012, the entire contents of which are incorporated herein by reference.

FIELD

The present invention relates to a wireless communication apparatus and a wireless communication method.

BACKGROUND

In recent years, next generation wireless communication technologies have been studied in order to achieve higher speed and larger capacity in wireless communication, in a wireless communication system such as a mobile phone system (cellular system). For example, a communication standard called long term evolution (LTE) and a communication standard called LTE-Advanced (LTE-A) which is based on an LTE wireless communication technology have been proposed by the 3rd Generation Partnership Project (3GPP) which is a standard organization.

In such a wireless communication system, for example, a plurality of wireless communications may be performed by one wireless terminal. Examples of the plurality of wireless communications are different types of wireless communications, and the examples thereof include LTE communication and wireless local area network (LAN). In this case, for example, circuits respectively corresponding to the plurality of wireless communications are provided together in one wireless terminal. This situation is referred to as, for example, In-device coexistence (IDC).

In addition, a technology for suppressing the number of uplink transmissions by multiplexing an uplink control signal and a data signal are known.

CITATION LIST

Patent Literature

PTL 1: Japanese National Publication of International Patent Application No. 2011-5232633
PTL 2: Japanese Laid-open Patent Publication No. 08-167872

Non Patent Literature

NPL 1: 3GPP TR36.816V11.2.0(2011-12)
NPL 2: 3GPP TS36.213V11.0.0(2012-09)
NPL 3: 3GPP TS36.331V11.1.0(2012-09)
NPL 4: 3GPP R2-123111(2012-05)

SUMMARY

According to an aspect of the invention, a wireless communication apparatus that performs transmission based on a radio resource that is allocated from another wireless communication apparatus, the wireless communication apparatus includes a memory, and a processor coupled to the memory and configured to, after a first radio resource for transmitting first information has been allocated, before transmitting the first information based on the first radio resource, when a second radio resource is allocated that is a radio resource of a timing different from a timing of the first radio resource and is a radio resource for transmitting second information, perform a transmission process of transmitting the first information and the second information based on the second radio resource and of not using the first radio resource for the transmission.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

In the wireless communication system described above, it is assumed that respective wireless communications are simultaneously performed by using the same bandwidth or similar frequency bandwidths. At this time, if the respective wireless communications are simultaneously performed in circuits respectively corresponding thereto in the wireless terminal, mutual interference occurs in the wireless terminal, and thus there is a concern of deterioration in communication performance.

The technology of the present disclosure has been made in view of the above circumstances, and an object of the present disclosure is to provide a wireless communication apparatus and a wireless communication method which are able to control interference in a wireless communication apparatus which performs a plurality of types of wireless communication and improve communication performance in the wireless communication apparatus.

The following description will be made regarding embodiments of a wireless communication apparatus and a wireless communication method which are disclosed in the present technology with reference to the drawings. In addition, the wireless communication apparatus and the wireless communication method which are disclosed in the present technology are not limited by the following embodiments.

Problem Identification

First, prior to the description regarding each embodiment, a description will be made regarding identification of the problem. The problem was newly found by an inventor upon considering the related art in detail, and it is noted that it was not known in the past.

As described above, it is assumed that a plurality of wireless communications are simultaneously performed (for example, a state such as IDC described above) in a wireless communication apparatus (for example, a wireless terminal) in the present application. In the following description, as an example, a plurality of wireless communications includes first wireless communication and second wireless communication. Further, it is assumed that the first wireless communication is performed by using a first antenna and the second wireless communication is performed by using a second antenna in the wireless terminal. In addition, a plurality of wireless communications may include three or more wireless communications.

Figure 1:
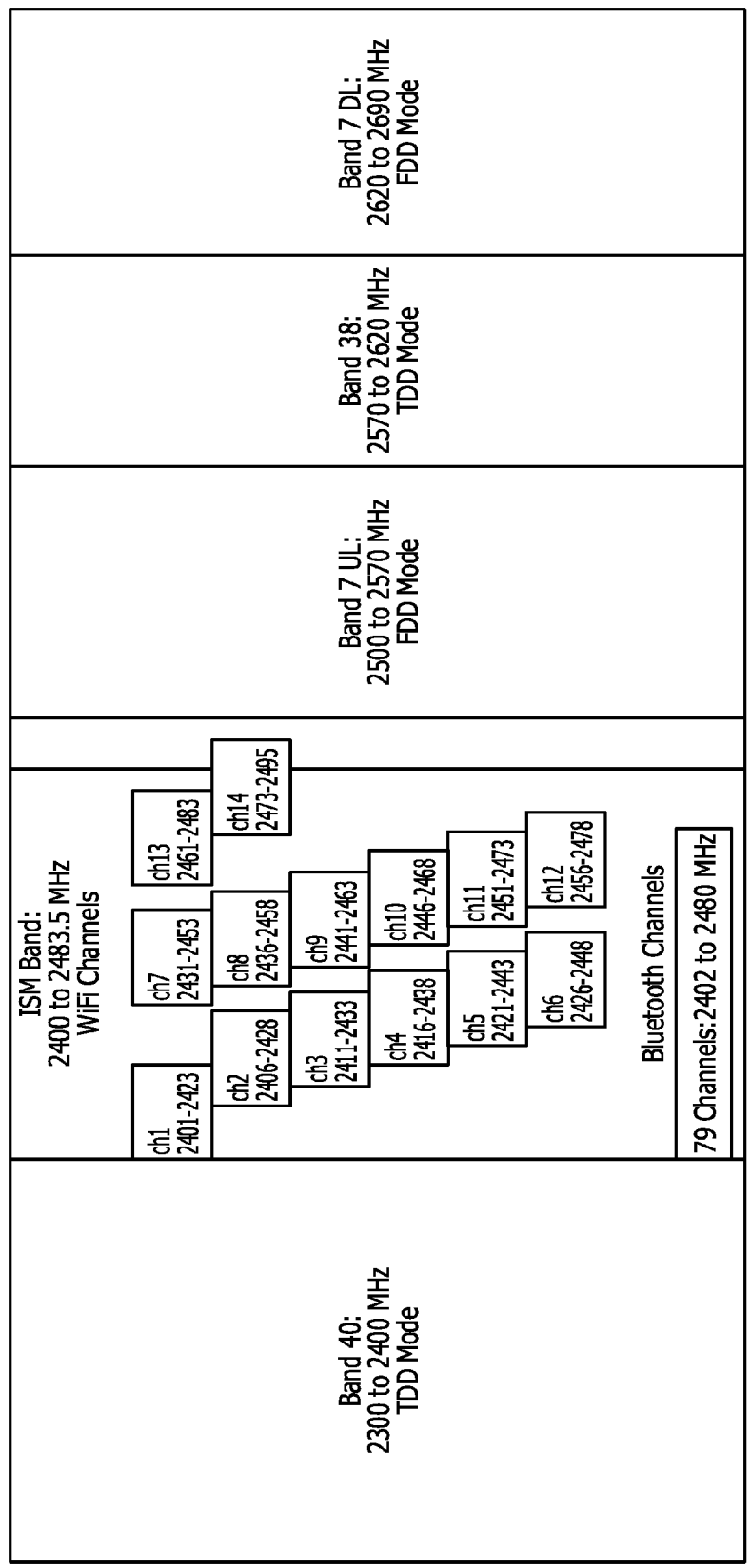
FIG. 1 is a diagram illustrating an allocation example of frequency bandwidths of a wireless communication system.

FIG. 1 illustrates an example of frequency bandwidths which are prepared in first wireless communication and second wireless communication. In the present application, for the sake of convenience, the first wireless communication is assumed as wireless communication based on a mobile telephone system such as LTE-A (hereinafter, referred to as "wireless communication based on LTE-A"). Meanwhile, the second wireless communication is assumed as wireless communication based on a wireless communication system other than the mobile telephone system such as LTE-A, for example, wireless communication based on a wireless LAN such as WiFi (registered trademark) or Bluetooth(registered trademark) (hereinafter, referred to as "wireless communication based on wireless communication schemes other than LTE-A).

As illustrated in FIG. 1, the first wireless communication and the second wireless communication are performed by using the same or a similar frequency bandwidth. For example, a case is assumed where a frequency bandwidth group prepared for the first wireless communication and a frequency bandwidth group prepared for the second wireless communication are adjacent to each other, or a case is assumed where the first wireless communication and second wireless communication share the same frequency bandwidth group. For example, an industry science medical (ISM) Band (2400 to 2483.5 MHz) is one of non-licensed bands, and is used in Bluetooth and WiFi. At this time, Band 40 (2300 to 2400 MHz) prepared for an LTE-ATDD Mode and Band 7 (2500 to 2570 MHz) prepared for an ULFDD Mode of LTE-A are frequency bandwidth groups which are adjacent to the ISM Band. Further, when the ISM Band is shared by LTE-A, the same frequency bandwidth is used for LTE-A, Bluetooth, and WiFi.

When frequency bandwidths are used as illustrated in FIG. 1, in a wireless communication apparatus corresponding to IDC, in a wireless terminal that simultaneously performs first wireless communication (wireless communication based on LTE-A) using a first antenna and second wireless communication (wireless communication based on wireless communication schemes other than LTE-A) using a second antenna, interference occurs between the first wireless communication and the second wireless communication. Specifically, for example, a transmission signal of the first wireless communication (a transmission signal of the first antenna) interferes with a reception signal of the second wireless communication (a reception signal of the second antenna). Further, a transmission signal of the second wireless communication (a transmission signal of the second antenna) interferes with a reception signal of the first wireless communication (a reception signal of the first antenna). In other words, mutual interference may occur between wireless communications in the wireless communication apparatus corresponding to IDC.

In order to remove or reduce the interference in such IDC, it is desirable to perform some kind of interference measurement. Several methods are considered as interference measurement of IDC according to LTE-A, and can be used by being combined arbitrarily.

An autonomous denial method is one of interference measurements of IDC according to LTE-A. In the autonomous denial method, a wireless terminal autonomously stops the transmission of the first wireless communication (wireless communication based on LTE-A). This is because while the transmission of the first wireless communication is stopped, the interference does not occur in the second wireless communication (wireless communication based on wireless communication schemes other than LTE-A). As an example, the wireless terminal can stop 30% of the transmission opportunities during 1000 subframes (one subframe corresponds to one millisecond). By doing so, it is possible to reduce or remove the interference in the reception of the second wireless communication based on the transmission of the first wireless communication.

In the autonomous denial method, the occurrence of interference in the second wireless communication (wireless communication based on wireless communication schemes other than LTE-A) is reduced or removed by stopping the transmission of the first wireless communication (wireless communication based on LTE-A) at a predetermined level (a rate, a frequency, and the like). In the extended or generalized method of this technology, even if the autonomous denial method is not performed, if it is possible to suppress the number of transmissions of the first wireless communication, it is considered that the occurrence of interference in the second wireless communication can be reduced or removed. According to this studied method, in the following description, a technology for suppressing the number of transmissions of the first wireless communication in the wireless terminal will be considered.

It is considered that the suppression of the number of transmissions in the wireless terminal can be realized by stopping the transmission (the transmission is not performed) when the wireless terminal has an opportunity for transmission. Thus, a case where the wireless terminal stops transmission of uplink data is considered first. However, if the transmission of uplink data is stopped, the amount of uplink data transmitted per unit of time is reduced, and thus the communication efficiency (throughput) of data transmission in the wireless terminal is reduced. Further, even if the radio resource for the transmission of uplink data is allocated, if the wireless terminal stops the transmission of uplink data, the radio resource is wasted. When a base station does not know that the transmission stop is the voluntary action of the terminal, the base station continues to assign a radio resource to the terminal; further, if the base station determines that the wireless environment of the terminal is poor, a situation of assigning excessive radio resources occurs. Such a situation has to be avoided in terms of efficient use of the radio resource or in terms of communication efficiency (throughput) of an entire system. Therefore, it is considered undesirable for the wireless terminal to stop the transmission of uplink data.

Next, it is considered that the wireless terminal stops the transmission of data other than the uplink data. An example of typical information other than the uplink data transmitted by the wireless terminal is a periodic channel quality indicator (periodic CQI). Here, the CQI is information indicating downlink reception quality (reception quality of the wireless terminal). Further, the CQI is uplink control information transmitted from the wireless terminal to the wireless base station, and is used for downlink scheduling for the wireless terminal by the wireless base station.

Figure 2:
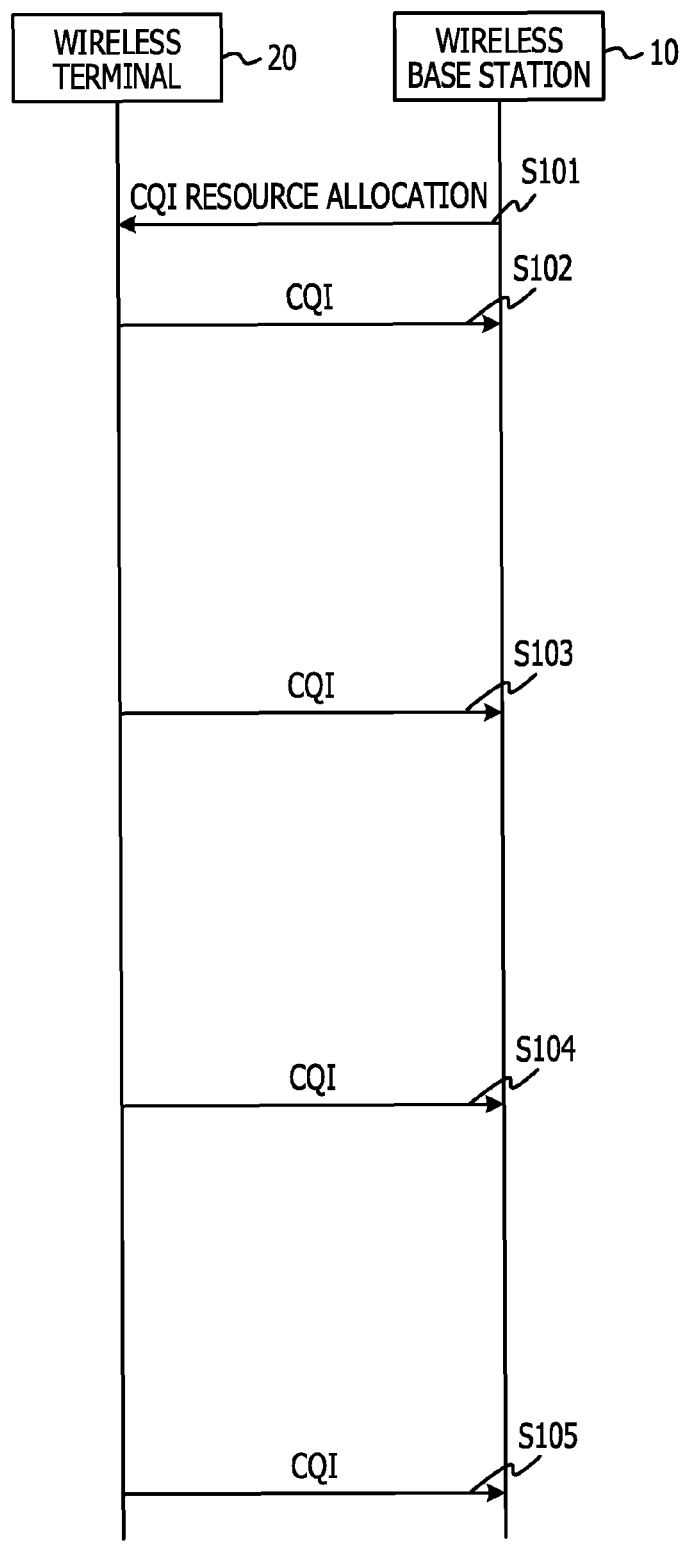
FIG. 2 is a diagram illustrating an example of a processing sequence of periodic CQI in a LTE system in the related art.

FIG. 2 is a diagram illustrating the periodic CQI. As illustrated in FIG. 2, the periodic CQI is performed by the wireless terminal 20 periodically transmitting the CQI. Specifically, in S101 of FIG. 2, the wireless base station 10 allocates a radio resource for CQI (including a transmission period) to the wireless terminal 20. Then, in S102 to S105 of FIG. 2, the wireless terminal 20 periodically transmits the CQI to the wireless base station 10, based on the radio resource for CQI transmission allocated in S101.

Meanwhile, frequency selective scheduling and adaptive modulation and coding (AMC) are used by being combined as the scheduling for the LTE system. The adaptive modulation coding is a technology of adaptively determining a modulation method and a coding method depending on a change in wireless quality.

In downlink adaptive modulation coding, it is assumed that the wireless base station 10 recognizes all the time the reception quality (radio wave conditions) of the wireless terminal 20 due to CQI. When it is determined that the reception quality of the wireless terminal 20 is good based on the received CQI, the wireless base station 10 applies a high-speed modulation scheme and coding scheme to the downlink communication destined for the wireless terminal 20. Meanwhile, when it is determined that the reception quality of the wireless terminal 20 is poor based on the received CQI, the wireless base station 10 applies a modulation scheme and a coding scheme which have a slow-speed but are resistant to error, to the downlink communication destined for the wireless terminal 20. In addition, the wireless terminal 20 selects a frequency domain portion having good characteristics among downlink wireless transmission bandwidths. In this manner, since the modulation scheme, the coding scheme, and the frequency domain are selected depending on the reception quality of the wireless terminal 20, it is possible to optimize the efficiency of the downlink transmission to the wireless terminal 20, and therefore improve the communication efficiency of the downlink communication of the entire system.

In this manner, since the adaptive modulation coding is employed in LTE, all of the wireless terminals 20 that have received downlink data are to transmit the periodic CQI, as a premise. Here, it is assumed that the wireless terminal 20 stops the transmission of the periodic CQI. As an example, a certain wireless terminal 20 can achieve the transmission stop of 50% of the transmission opportunities, by reducing the transmission of the periodic CQI every other time. At this time, the transmission cycle of the CQI becomes about twice as large as the normal length. As a result, the modulation scheme and the coding scheme which are applied to the downlink data do not reflect the latest reception quality. This is because the older periodic CQI than the reduced periodic CQI is applied to the downlink data communication of which the modulation and coding schemes have been determined based on the periodic CQI before being reduced. Thus, since the error rate of the reception signal increases and the retransmission occurrence rate also increases in association therewith and the effect of adaptive modulation coding is no longer sufficiently exhibited, this leads to lowering of the communication efficiency (throughput) of each wireless terminal 20 and the entire system, which is considered to be undesirable. Therefore, it has to avoid stopping the transmission of the periodic CQI as much as possible in the wireless terminal 20.

In addition, examples of the uplink control information which is periodically transmitted in LTE include a precoding matrix indicator (PMI) and rank information (RI) in addition to the CQI. The control information is used when a multiple input multiple output technology is applied, and can be handled similar to the CQI in the present application. In the present applciation, hereinafter, a description mainly will be made based on the periodic CQI, it is desired to be noted that it is also applicable to the periodic PMI and the periodic RI.

Further, examples of the information which is transmitted by the wireless terminal 20 include a random access signal, an aperiodic CQI, a scheduling request (SR), an acknowledge (ACK) or a negative acknowledge (NACK) which are response signals for the downlink data, and the like, in addition to the uplink data and the periodic CQI. However, with respect to the transmission of a normal random access signal, the wireless terminal may select a transmission timing among the predetermined transmission timings. Further, since ACK or NACK is uplink control information which is directly related to the downlink data transmission, stopping these leads to unexpected retransmission of downlink data, and thus results in the same disadvantages as stopping of data transmission. Since the transmission delay occurrence of the uplink data may be allowed during an SR, there is no problem even if the transmission is temporarily stopped.

In summary, as a first requirement, it is desirable to reduce, as much as possible, the number of transmissions of the wireless communication in the wireless terminal 20 in order to reduce or remove the interference in other wireless communication. Meanwhile, the stopping of uplink data transmission by the wireless terminal 20 leads to a large negative effect, therefore, as a second requirement, it has to avoid stopping the periodic CQI transmission as much as possible. Here, these two requirements seem to be contradictory at first glance, but they can be compatible with each other by using a technology described later (for the sake of convenience, referred to as a reference technology in the application).

Figure 3:
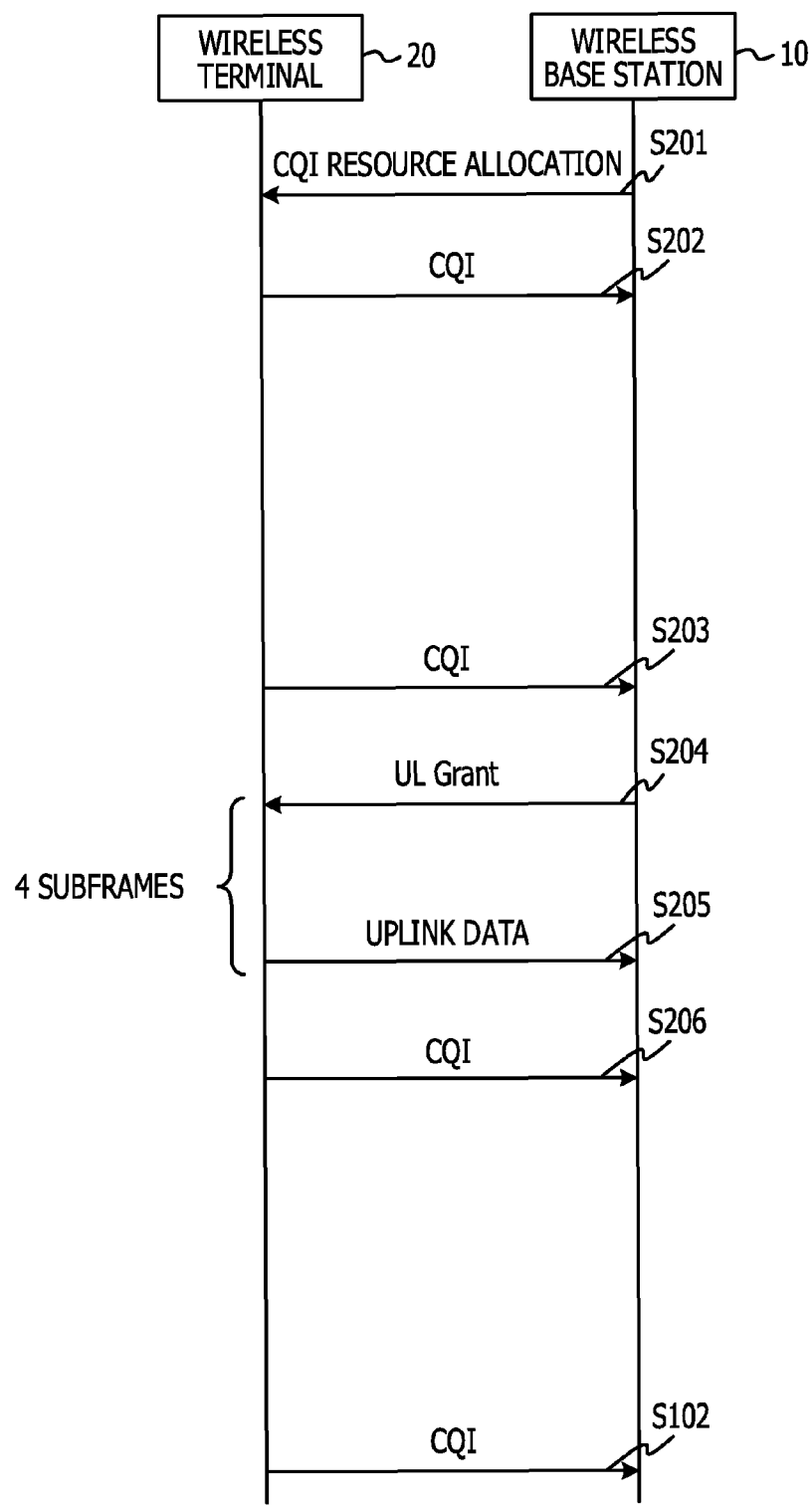
FIG. 3 is a diagram illustrating an example of a processing sequence of the periodic CQI and uplink data transmission in the LTE system in the related art.

First, prior to the description of the reference technology, with reference to FIG. 3, a description will be made regarding a normal processing sequence when the uplink data transmission and periodic CQI transmission are carried out in parallel. Since S201 to S203 and S206 to S207 in FIG. 3 relating to periodic CQI transmission are processes corresponding to S101 to S105 in FIG. 2, a description thereof will be omitted.

The process relating to the uplink data transmission in FIG. 3 will be described. In S204 of FIG. 3, the wireless base station 10 transmits a UL grant to the wireless terminal 20. The UL grant is a downlink control signal in the wireless base station 10 that allows the wireless terminal 20 to transmit the uplink data. In contrast, in S205 of FIG. 3, the wireless terminal 20 transmits uplink data, in response to the UL grant in S204. Here, it is defined that uplink (UL) data is transmitted in the subsequent fourth subframe from the subframe in which the UL grant has been transmitted, in the LTE system (in a case of frequency division duplex (FDD)). Therefore, the UL data is transmitted in S205 in the subsequent fourth subframe from the UL grant in S204.

Next, the reference technology satisfying the two above described requirements will be described with reference to FIG. 4. Since processes of S301 to S303 and S306 in FIG. 4 are processes corresponding to S201 to S203 and S207 in FIG. 3, a description thereof will be omitted.

Figure 4:
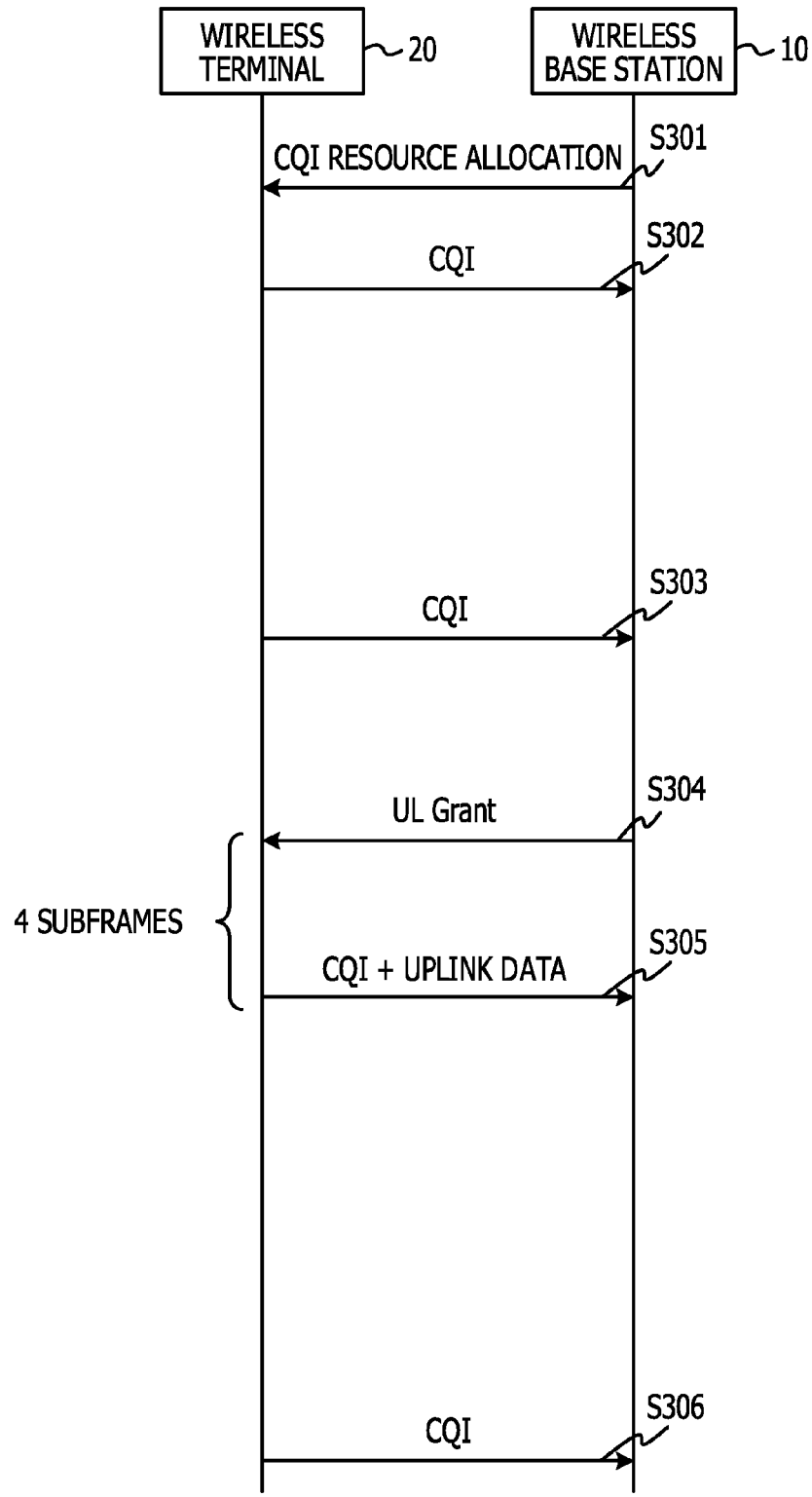
FIG. 4 is a diagram illustrating an example of a processing sequence of periodic CQI and uplink data transmission according to a reference technology.

The wireless base station 10 transmits a UL grant to the wireless terminal 20 in S304 of FIG. 4. Here, S304 of FIG. 4 and S204 of FIG. 3 are similar in that the wireless base station 10 transmits the UL grant to the wireless terminal 20, but are different in the transmission timings thereof. In S304, the wireless base station 10 transmits the UL grant to the wireless terminal 20 in a previous fourth subframe from the subframe in which the wireless terminal 20 transmits the periodic CQI. Since the UL grant is transmitted at such a timing, the transmission timing of the UL data and the transmission timing of the periodic CQI are adjacent to each other. Thus, in S305 of FIG. 4, the wireless terminal 20 can transmit the periodic CQI and the uplink data in the same subframe. In addition, it is defined in the LTE system that normal periodic CQIs (S302, S303, S306, and the like) are transmitted through a physical uplink control channel (PUCCH), and the uplink data is transmitted through a physical uplink shared channel (PUSCH). In contrast, it is defined in a wireless physical layer related specification of the LTE system that the periodic CQI and the uplink data are multiplexed and transmitted through the PUSCH with a purpose of not-increasing a peak-to-average power ratio (PAPR) of a signal waveform of a wireless signal transmitted from the wireless terminal, when the periodic CQI and the uplink data are transmitted in the same subframe (S305).

In the reference technology illustrated in FIG. 4, the periodic CQI and the uplink data can be transmitted in the same subframe. Therefore, according to the reference technology, it is possible to further suppress the number of transmissions in the wireless terminal as compared to the case of FIG. 3 where the uplink data transmission and the periodic CQI transmission are performed separately. In other words, the amount of time to cause interference in other wireless circuits (a reception circuit of the second wireless communication) is shortened. Further, in the reference technology, since neither the uplink data transmission nor the periodic CQI transmission stops, there is no disadvantage due to the stop. Therefore, according to the reference technology, the two above described requirements are satisfied.

In contrast, as described below, there remains a problem in that the reference technology is not applicable all the time. In other words, it may be difficult to apply the reference technology in some cases depending on the situation. Hereinafter, a description will be made regarding a case where it is difficult to apply the reference technology as an example.

In short, the reference technology is a technology that depends on the scheduling performed by the wireless base station 10. Here, it can be said that the scheduling is a process of determining when transmission is to be performed and to which wireless terminal 20, among the many wireless terminals 20 that are managed by the wireless base station 10. The scheduling for the wireless terminal 20 is performed only by the wireless base station 10 with authority on considering various conditions, and there is a case where priority is given to each wireless terminal 20, based on, for example, a difference in contract types which is one of the conditions.

When priority is given to each wireless terminal 20, or there is a wireless terminal that transmits and receives data of a type having high priority (for example, data of real-time audio communication), there is a possibility that the wireless terminal 20 having a low priority is not able to utilize the reference technology illustrated in FIG. 4. For example, when there is a desire for other wireless terminals 20 having high priority to use a lot of uplink radio resources in a subframe in which the wireless terminal 20 having low priority transmits the periodic CQI (for example, S305), it is difficult to apply the reference technology to the wireless terminal 20 having low priority. In such a case, it is difficult to transmit the periodic CQI and the uplink data in the same frame to the wireless terminal 20 having low priority, and as illustrated in FIG. 3, it is considered to inevitably perform the allocation of the radio resource in order to separately transmit data. Further, when there is a wireless terminal that frequently retransmits data, delay increase in the data transmission is suppressed, and thus there is a situation where a radio resource is preferentially allocated as compared to a wireless terminal that transmits new data. In this manner, there is a problem of not utilizing the reference technology all the time.

In summary, according to the reference technology described above, it is possible to suppress the number of uplink transmissions without stopping the uplink data transmission and the periodic CQI transmission. Therefore, according to the reference technology, it is possible to achieve the two above described requirements. Thus, in the reference technology, since it is possible to suppress the number of transmissions of the first wireless communication while avoiding the disadvantage associated with the transmission stop of the first wireless communication (wireless communication based on LTE-A), it is considered to reduce or delete the given interference for the reception of the second wireless communication (wireless communication based on wireless communication schemes other than LTE-A) due to transmission of the first wireless communication. However, there remains a problem in that the reference technology is not applicable all the time. As described above, the problem has been newly found by the inventor upon considering the related art, and was not known in the past. Hereinafter, respective embodiments of the present application for solving the problem will be described in order.

First Embodiment

In a first embodiment, when a radio resource has been allocated in advance to the wireless terminal 20, and thereafter, another radio resource is allocated, the information destined to be transmitted through the radio resource allocated in advance is transmitted, based on the radio resource that is allocated thereafter, and transmission is not performed through the radio resource that has been allocated in advance. In other words, provided is a wireless communication apparatus that performs transmission based on a radio resource that is allocated from another wireless communication apparatus, and includes a transmission unit that, after a first radio resource for transmitting first information has been allocated, before the first information is transmitted based on the first radio resource, when a second radio resource is allocated which is a radio resource of a timing different from a timing of the first radio resource and is intended to transmit second information, performs a transmission process of transmitting the first information and the second information based on the second radio resource and of not performing transmission based on the first radio resource.

Figure 5:
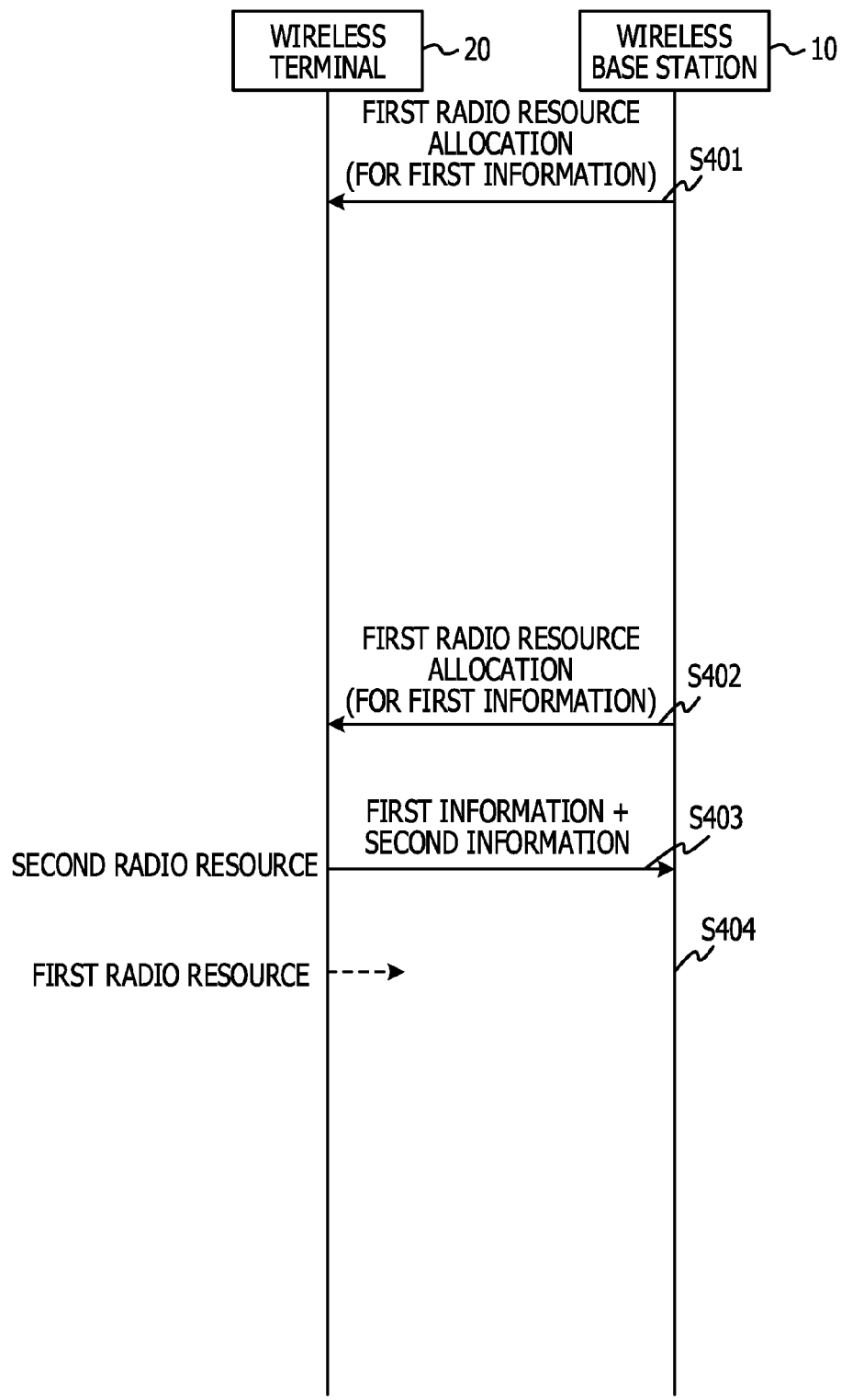
FIG. 5 is a diagram illustrating an example of a processing sequence of periodic CQI and uplink data transmission according to a first embodiment.

FIG. 5 illustrates an example of a processing sequence of a wireless communication system according to the first embodiment.

In S401 of FIG. 5, the wireless base station 10 allocates a first radio resource to the wireless terminal 20. It is assumed that the first radio resource has a time component, and is a radio resource of a time T1 after S401. Further, it is assumed that the first radio resource is a radio resource for transmitting first information. The first information can be, for example, the CQI, but may be any other information. The wireless base station 10 may designate to the wireless terminal 20 that the information to be transmitted through the first radio resource is the first information in S401, or may designate or define it in advance by previous signaling and the like. The allocation of the first radio resource can be realized by, for example, downlink radio resource control (RRC) signaling, but may be realized by the other control information and the like.

In S402 of FIG. 5, the wireless base station 10 allocates a second radio resource to the wireless terminal 20. It is assumed that the second radio resource also has a time component and is a radio resource of a time T2 which comes after S402 and before the time T1. Further, it is assumed that the second radio resource is a radio resource for transmitting the first information and second information. The second information can be, for example, uplink user data, but may be any other information. The wireless base station 10 may designate to the wireless terminal 20 that the information to be transmitted through the second radio resource is at least the second information in S402, or may designate or define it in advance by previous signaling and the like. The resource amount (size) of the second radio resource is assumed to be large enough to map the first information and the second information. The allocation of the second radio resource can be implemented by using, for example, downlink control information (DCI) which is control information of a downlink, but may be implemented by using other control information (for example, RRC signaling or MAC signaling in LTE). In a radio section of the LTE system, the DCI is entered in a physical downlink control channel (PDCCH) or an enhanced physical downlink control channel (EPDCCH) which are physical channels and transmitted from the wireless base station 10 to the wireless terminal 20.

In S403 of FIG. 5, the wireless terminal 20 performs transmission based on the second radio resource. At this time, the wireless terminal 20 transmits the first information destined to be transmitted through the first radio resource first (at the time of S401) in addition to the second information to be transmitted through the second radio resource is transmitted, based on the second radio resource. The wireless terminal 20 may determine to transmit the first information in addition to the second information in S403, based on a predetermined rule. As an example, the predetermined rule may be such that if a timing difference between the time component T1 of the first radio resource and the time component T2 of the second radio resource is equal to or less than a predetermined value, the first information is also to be transmitted through the second radio resource.

In S404 of FIG. 5, the wireless terminal 20 stops transmission based on the first radio resource. In other words, the wireless terminal 20 does not perform transmission using the first radio resource.

According to the wireless communication system according to the first embodiment described with reference to FIG. 5, the first information to be transmitted through the first radio resource and the second information to be transmitted through the second radio resource are collected and transmitted through the second radio resource. Then, in the wireless communication system according to the first embodiment, the transmission based on the first radio resource is stopped. Thus, the wireless communication system according to the first embodiment enables a reduction in the number of transmissions by the wireless terminal, as compared to the case of transmitting the first information through the first radio resource and transmitting the second information through the second radio resource.

Further, the wireless communication system according to the first embodiment enables transmission of the first information and the second information through the second radio resource of a timing different from the timing of the first radio resource that has been allocated in advance. Then, in the wireless communication system according to the first embodiment, the transmission based on the first radio resource is stopped. Thus, the wireless communication system according to the first embodiment enables a reduction in the number of transmissions by securing the second radio resource of the different timing, even when it is difficult to secure a radio resource in a timing, for example, corresponding to the first radio resource. Therefore, the wireless communication system according to the first embodiment can utilize the reference technology described above without any problem even in a case having a problem in application.

Next, a modification of the first embodiment will be described. In the modification, as a premise, it is assumed that the wireless terminal 20 corresponds to IDC. More specifically, it is assumed that the wireless terminal 20 can simultaneously perform the first wireless communication (wireless communication based on LTE-A) and the second wireless communication (wireless communication based on wireless communication schemes other than LTE-A).

Figure 6:
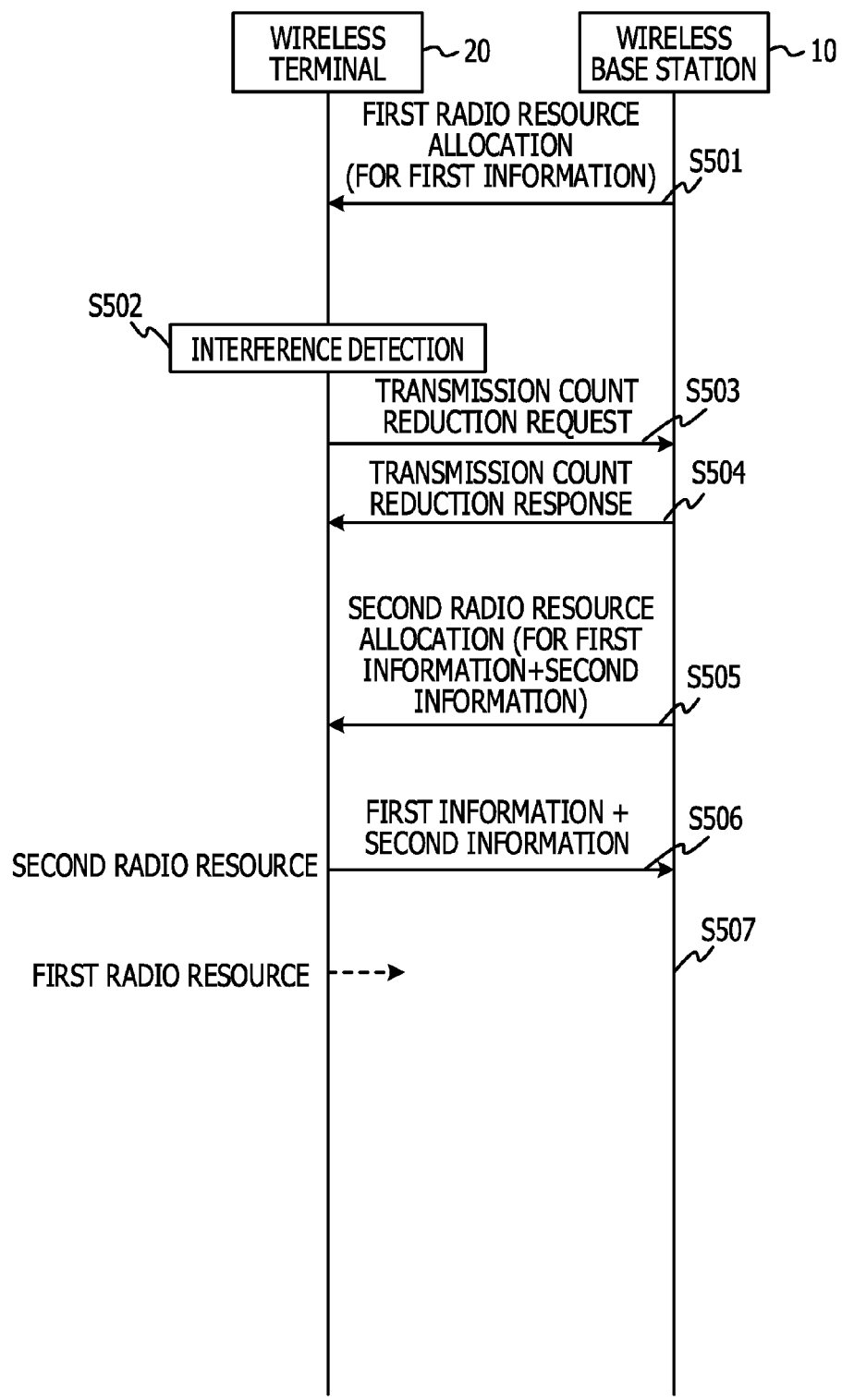
FIG. 6 is a diagram illustrating an example of a processing sequence of periodic CQI and uplink data transmission according to a modification of the first embodiment.

FIG. 6 illustrates an example of a processing sequence of a wireless communication system according to the modification of the first embodiment. Since S501 of FIG. 6 is a process corresponding to S401 of FIG. 5, the details thereof will be omitted.

In S502 of FIG. 6, the wireless terminal 20 detects the occurrence of interference caused by the transmission signal of the first wireless communication (wireless communication based on LTE-A) of IDC to the reception signal of the second wireless communication (wireless communication based on wireless communication schemes other than LTE-A). In addition, it is assumed that a detection method of interference occurrence does not matter. For example, the wireless terminal 20 can detect the occurrence of interference by determining whether a reception error rate of the second wireless communication is equal to or greater than a predetermined value when performing the transmission of the first wireless communication. As an example, an influence may be detected that the transmission of the first wireless communication exerts on the reception of the second wireless communication, by a collective control circuit within the wireless terminal 20 observing how the reception error rate of the second wireless communication varies, when changing the transmission power of the transmission signal of the first wireless communication. The signals that are transmitted in the first wireless communication at the time of detection of interference occurrence may be a sounding reference signal (SRS) which is a scheduling uplink reference signal, a data signal (PUSCH), or a control signal (PUCCH). Further, in S502, not only the presence or absence of the occurrence of interference but also the magnitude of the interference which occurs may be measured (detected). For example, the wireless terminal 20 can use a difference value between the reception error rate of the second wireless communication at the time of transmission of the first wireless communication and a predetermined value, when calculating the size of the interference which occurs.

Next, in S503 of FIG. 6, the wireless terminal 20 transmits a transmission count reduction request for making a request for a reduction in the number of transmissions to the wireless base station 10, depending on detection of interference occurrence in S502. When the size of the interference is measured in S502, the transmission count reduction request may store information indicating the size of the interference. The transmission count reduction request can be implemented by, for example, an uplink RRC signaling. A specific time ratio value of reduction in the number of transmissions may also be transmitted.

Next, in S504 of FIG. 6, the wireless base station 10 transmits a transmission count reduction response which is a response signal for the transmission count reduction request to the wireless terminal 20. Here, when the transmission count reduction request is received from the wireless terminal 20, the wireless base station 10 may determine whether or not to allow transmission reduction in the wireless terminal 20, and transmit the transmission count reduction request based on the determination result. For example, when the transmission count reduction request of S503 stores the information indicating the size of the interference, the wireless base station 10 can determine whether or not to allow the reduction in the number of transmissions based on the size of the interference in S504. Further, the wireless base station 10 may determine whether or not to allow the reduction in the number of transmissions to the wireless terminal 20, based on any other information or situation (for example, congestion of radio resources). When the reduction in the number of transmissions is allowed, the wireless base station 10 can transmit the transmission count reduction response indicating that result to the wireless terminal 20. Meanwhile, when the reduction in the number of transmissions is not allowed, the wireless base station 10 can transmit the transmission count reduction response indicating that result to the wireless terminal 20. When the reduction in the number of transmissions is not allowed, the wireless base station 10 may instruct lowering of the current transmission power value by a constant value (ten and several dB or more). In the case of LTE, the adjustment of transmission power of the wireless terminal is performed using the TPC commands transmitted in DCI, but in the TPC command, the transmission power value is lowered only by a maximum of 1 dB in a single TPC command transmission. Further, for example, when the reduction in the number of transmissions is not allowed, the wireless base station 10 may transmit the result of "non-permission" to the wireless terminal 20 without transmitting the transmission count reduction response. The transmission count reduction response may be implemented, by, for example, downlink RRC signaling.

In S504 of FIG. 6, if the transmission count reduction response is transmitted, thereafter, the wireless base station 10 performs uplink scheduling for reducing the number of transmissions and receives an uplink signal based on the uplink scheduling. Meanwhile, if the transmission count reduction response is received, thereafter, the wireless terminal 20 receives the uplink signal based on scheduling for reducing the number of transmissions. In other words, the wireless base station 10 and the wireless terminal 20 in FIG. 6 perform the uplink scheduling and the transmission and reception which are employed in a general LTE system as illustrated in FIG. 3 and FIG. 4 before transmitting and receiving the transmission count reduction response. In contrast, the wireless base station 10 and the wireless terminal 20 in FIG. 6 perform the uplink scheduling and the transmission and reception as illustrated in FIG. 5 after transmitting and receiving the transmission count reduction response. Since S505 to S507 of FIG. 6 are processes corresponding to S402 to S404 of FIG. 5, the details thereof will be omitted.

Further, in the modification of the first embodiment illustrated in FIG. 6, after transmitting and receiving the transmission count reduction response in S504, the reduction in the number of transmissions may be stopped based on a predetermined procedure. For example, when the transmission and reception of the second wireless communication has completely ended, the reduction in the number of transmissions is not desired in the first wireless communication. In such a case, the wireless terminal 20 may transmit a transmission count reduction stop request to the wireless base station 10, and the wireless base station 10 may transmit a transmission count reduction stop response to the wireless terminal 20.

According to the modification of the first embodiment illustrated above, it is possible to switch between applying and not applying the scheduling having a reduced number of transmissions, and transmission and reception, depending on whether interference occurs in other wireless communication, in addition to the effect achieved in the first embodiment. In other words, according to the modification of the first embodiment, there is an effect that the scheduling and the transmission and reception according to the first embodiment can be performed depending on a situation.

Second Embodiment

A second embodiment corresponds to a case where the first radio resource in the first embodiment is a periodic radio resource. In other words, the second embodiment is a wireless communication apparatus of the first embodiment, in which the first radio resource is a radio resource remained after the second radio resource has been allocated, among periodic radio resources, and is a radio resource having the smallest timing difference with the second radio resource.

Hereinafter, a case where the periodic radio resource in the second embodiment (corresponding to the first radio resource in the first embodiment) is a radio resource for transmitting the periodic CQI in the LTE system is an example. However, as described later, it is noted that the second embodiment is not limited to the periodic CQI in the LTE system.

Figure 7:
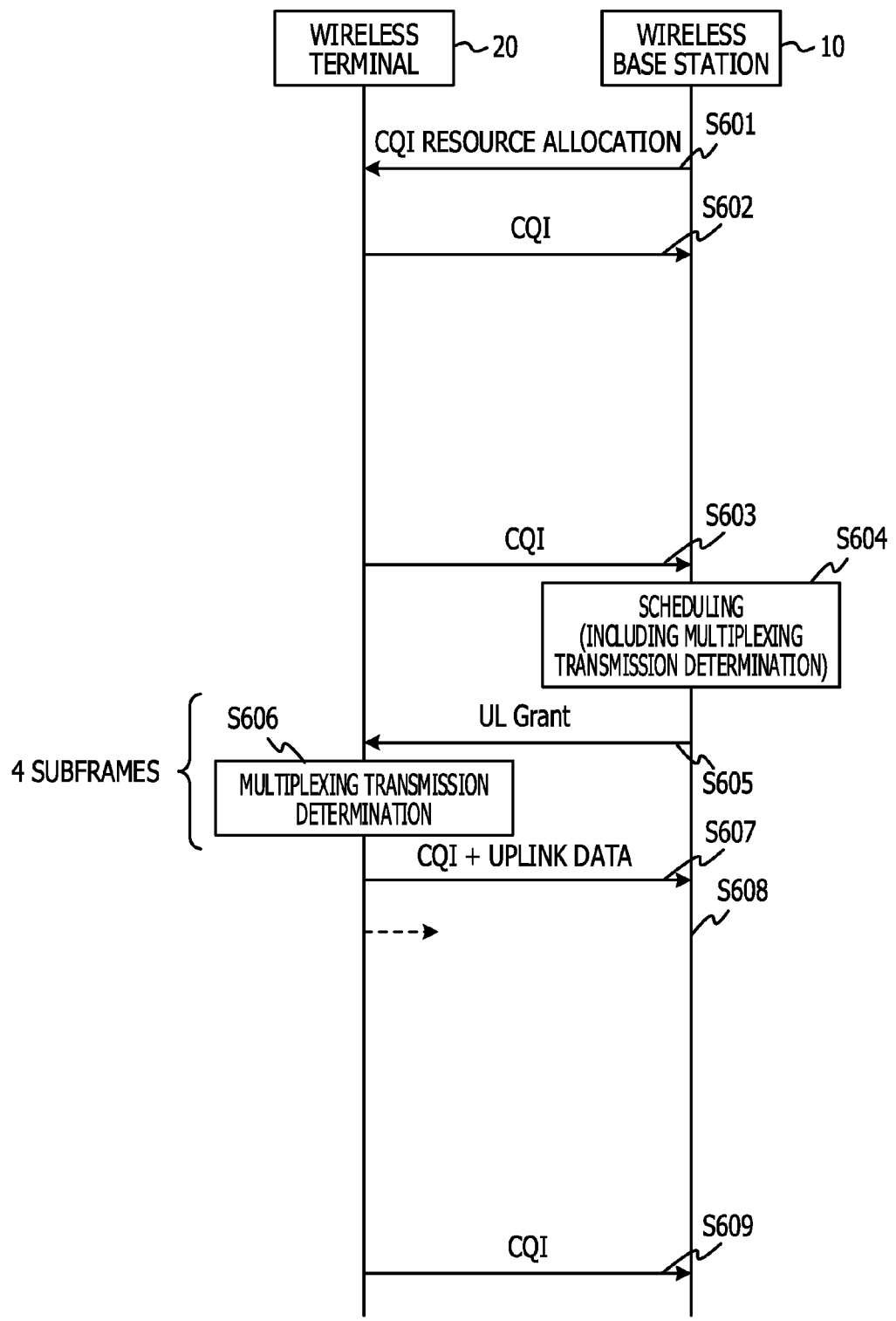
FIG. 7 is a diagram illustrating an example of a processing sequence of periodic CQI and uplink data transmission according to a second embodiment.

FIG. 7 illustrates an example of a processing sequence of a wireless communication system according to the second embodiment. The second embodiment is similar to the first embodiment in many parts. Hereinafter, parts of the second embodiment which are different from the first embodiment will be mainly described.

First, in S601 of FIG. 7, the wireless base station 10 allocates an uplink radio resource for transmitting the periodic CQI, to the wireless terminal 20. The allocation of the radio resource for periodic CQI is implemented through an RRC connection setup message or an RRC connection reconfiguration message, both of which are RRC signaling. The radio resource for periodic CQI is periodically allocated every several subframes (one subframe is one millisecond). It is possible to use 2, 5, 10, 20, 40, 80, 160, 32, 64, or 128 subframes as the transmission cycle of the periodic CQI in the LTE system. The wireless base station 10 designates one of these transmission cycles for the wireless terminal 20 in the allocation of the radio resource for periodic CQI.

Further, the wireless base station 10 designates an offset value (in a unit of a subframe) corresponding to a time for transmitting first the periodic CQI for the wireless terminal 20 in the allocation of the radio resource for periodic CQI. Further, wireless base station 10 designates a resource for mapping the periodic CQI in each subframe for the wireless terminal 20 during the allocation of the radio resource for periodic CQI. The wireless base station 10 transmits these parameters to the wireless terminal 20 through RRC signaling, and thus the wireless base station 10 and the wireless terminal 20 can synchronously perform the transmission and reception of the periodic CQI.

After S601, the wireless terminal 20 transmits the periodic CQI to the wireless base station 10, based on the radio resource allocated in S601. First, in the first transmission, the wireless terminal 20 maps the CQI to the resource designated in S601 and transmits the CQI, in a subframe that is determined by the offset value and the transmission interval which are designated in S601. Further, thereafter, the wireless terminal 20 maps the CQI to the resource designated in S601 and transmits the CQI, in a subframe for each transmission interval designated in S601. In addition, in the transmission of CQI, the wireless terminal 20 measures the reception quality of a downlink signal for calculating the CQI (not illustrated). The wireless terminal 20 measures the reception quality of the downlink signal by receiving and measuring a reference signal (a pilot signal) that the wireless base station 10 has transmitted in a downlink wireless section. It may be assumed that the wireless base station 10 designates in advance a period for the measurement in the wireless terminal 20.

In FIG. 7, the wireless terminal 20 transmits the periodic CQI to the wireless base station 10 in S602 and S603. In addition, S602 is described as the first transmission of the periodic CQI in FIG. 7 due to space limitations, but it is noted that S602 is not limited to such a case. In other words, S602 may be any transmission of the periodic CQI (N-th transmission; Here, N is an arbitrary natural number).

Next, in S604 of FIG. 7, the wireless base station 10 performs the scheduling of the uplink radio resource for transmitting the uplink data to the wireless terminal 20. The wireless base station 10 performs scheduling of the uplink data radio resource for each wireless terminal 20, for at least the subsequent fifth subframe from that time. As described above, since four subframes of the interval are desired until the uplink data is transmitted after the wireless base station 10 has allowed the wireless terminal 20 to transmit the uplink data, even if the scheduling for the subframe within four subframes is performed, it is difficult for the wireless terminal 20 to transmit the uplink data.

In the scheduling of S604, a predetermined procedure is performed in advance between the wireless terminal 20 and the wireless base station 10 (not illustrated). Specifically, first, the wireless terminal 20 transmits a scheduling request (SR) which is a control signal that makes a request for the allocation of the uplink radio resource for transmitting the uplink data to the wireless base station 10. The SR is transmitted to the wireless base station 10 by using the PUCCH resource for SR transmission which is allocated in advance to the wireless terminal 20. When the PUCCH resource is not allocated, a scheduling request for the UL radio resource allocation request is performed for the wireless base station, by using the random access procedure. Next, the wireless base station 10 transmits a UL grant which is an initial grant for allocating a predetermined amount of uplink radio resources, to the wireless terminal 20. Then, the wireless terminal 20 transmits a buffer status report (BSR) indicating the data size of the uplink data to the wireless base station 10, based on the predetermined amount of uplink radio resources which are allocated by the UL grant. Then, the wireless base station 10 in the general LTE system determines the size of the uplink radio resource that is designated in the UL grant based on the received BSR. However, as described below, the wireless base station 10 of the embodiment determines the size of the uplink radio resource that is designated by the UL grant by adding the size of the CQI to the BSR in a predetermined case.

A description will be made regarding a method of determining the radio resource size allocated to the wireless terminal 20 in the scheduling of S604. In S604, the wireless base station 10 of the present embodiment determines whether or not to perform multiplexing transmission of the uplink data and the CQI, and determines the radio resource size allocated to the wireless terminal 20, based on the determination result. The determination of whether or not to perform multiplexing transmission of the uplink data and the CQI is performed based on a predetermined rule that is shared between the wireless base station 10 and the wireless terminal 20. This allows the wireless base station 10 and the wireless terminal 20 to synchronously perform the transmission and reception of the uplink data and the CQI. In addition, the predetermined rule may be predefined, or may be appropriately set by the signaling between the wireless base station 10 and the wireless terminal 20.

Here, as an example of the predetermined rule, it is possible to determine whether or not a timing difference between the subframe including the radio resource for the uplink data transmission of the wireless terminal 20 and the subframe for transmitting a first periodic CQI following the subframe for the wireless terminal 20 is equal to or less than a predetermined value (in a unit of a subframe). When the timing difference is large, if the periodic CQI and uplink data are multiplexed and transmitted, a transmission interval between the multiplexed CQI and the next CQI is wide, and the effect of the adaptive modulation coding based on the CQI is considered to decrease. Therefore, when the variation of the reception quality is severe or the reception quality is estimated to be severe (such as a case where the moving speed of the wireless terminal 20 is large), a predetermined value of the timing difference may be adjusted so as to be set to a small value. In addition, it is possible to set a predetermined value according to the timing difference to a value that is equal to or greater than the transmission interval of the periodic CQI, and the CQI is multiplexed with the uplink data in such a case.

In S604, when it is determined to transmit the uplink data while not being multiplexed with the CQI in a certain subframe, the wireless base station 10 assigns the size of the radio resource for uplink data transmission in the subframe to be at least the same size as the uplink data. In addition, the wireless base station 10 can obtain the size of the uplink data from the above described BSR. Meanwhile, when it is determined to multiplex and transmit the uplink data and the CQI in a certain subframe, the wireless base station 10 assigns the size obtained by adding the size of the uplink data and the size of the CQI or more as the size of the radio resource for uplink data transmission in the subframe. In other words, the size of the CQI is added to the size of the uplink data. Here, both sizes are sizes after coding and modulation.

In the second embodiment illustrated in FIG. 7, it is assumed that the wireless base station 10 determines in S604 that the wireless terminal 20 is to perform the multiplexing transmission of the uplink data and the CQI.

Next, in S605 of FIG. 7, the wireless base station 10 allocates the uplink radio resource for transmitting the uplink data to the wireless terminal 20, based on the scheduling result of S604. The allocation of the radio resource for uplink data transmission is implemented by the format 0 or 4 (or a format in which the functions of these formats are expanded) of the downlink control information (DCI) which is a downlink control signal. Since these control signals can be interpreted as signals for the wireless base station 10 that allow the wireless terminal 20 to transmit the uplink data, they are commonly referred to as the UL grant. In the present application, these control signals will be referred to as the UL grant.

The wireless base station 10 allocates the uplink radio resource of the size determined in S604 by the UL grant, to the wireless terminal 20. Here, in the LTE system, the radio resource for uplink data transmission designated by the UL grant is determined as the radio resource in the subsequent fourth subframe from the subframe in which the UL grant is transmitted (in the case of FDD). Therefore, the UL grant of S605 is transmitted in the previous fourth subframe from the subframe which has been scheduled in S604.

Next, in S606 of FIG. 7, the wireless terminal 20 determines whether or not to perform multiplexing transmission of the CQI and the uplink data. The wireless terminal 20 performs the determination of whether or not to perform multiplexing transmission of the CQI and the uplink data based on the predetermined rule (described above) shared with the wireless base station 10. As described above, in the first embodiment illustrated in FIG. 7, in S604, the wireless base station 10 determines to cause the wireless terminal 20 to perform the multiplexing transmission of the CQI and the uplink data. For this reason, in S606, it is determined that the wireless terminal 20 performs the multiplexing transmission of the CQI and the uplink data.

Next, in S607 of FIG. 7, the wireless terminal 20 performs the multiplexing transmission of the CQI and the uplink data, based on the determination result of S606. Here, the multiplexing transmission means that at least the uplink data and the CQI are transmitted in the same subframe. At this time, the uplink data and the CQI are multiplexed to the PUSCH in the same subframe. Here, a multiplexing method may conform to the method described regarding the related art based on FIG. 4. Meanwhile, in S607, the wireless base station 10 receives the uplink data and the CQI which are multiplexed in the same subframe, based on the determination performed in S604 indicating the multiplexing transmission.

Next, in S608 of FIG. 7, the wireless terminal 20 stops the transmission of the periodic CQI, based on the determination performed in S604. The periodic CQI of S608 corresponds to a first periodic CQI after the uplink data and the CQI have been transmitted in the same subframe (S607). Then, last, in S609 of FIG. 7, the wireless terminal 20 transmits the periodic CQI. Thus, the wireless terminal 20 skips the transmission of the periodic CQI once. It is possible to suppress the reduction in the effect of the adaptive modulation coding based on an increase in the transmission interval of the CQI, by transmitting the CQI in S607 instead of skipping the transmission of the periodic CQI once.

In addition, as described above, the processing sequence of FIG. 7 corresponds to the case where the wireless base station 10 determines in the scheduling (S604) that the wireless terminal 20 transmits the uplink data and the CQI while being multiplexed. In contrast, a brief description will be made regarding the case where the wireless base station 10 determines in the scheduling (S604) that the wireless terminal 20 transmits the uplink data and the CQI while not being multiplexed. In this case, in S607, the wireless terminal 20 transmits only the uplink data to the wireless base station 10. Then, in S608, the wireless terminal 20 transmits the periodic CQI. In other words, in the case of not performing the multiplexing transmission of the uplink data and the CQI, differently from the processing sequence of FIG. 7, the periodic CQI is transmitted without being skipped, and the uplink data is transmitted independently from the periodic CQI.

According to the wireless communication system according to the second embodiment described based on FIG. 7, the CQI to be transmitted in the radio resource for periodic CQI that has been allocated in advance and the data signal to be transmitted in the radio resource for data transmission that is allocated thereafter are both transmitted in the radio resource for data transmission. Then, in the wireless communication system according to the second embodiment, the CQI transmission is skipped once in the radio resource for periodic CQI. Thus, in the wireless communication system according to the second embodiment, it is possible to reduce the number of transmissions as compared to the case of transmitting the CQI and the data in separate subframes.

Further, the wireless communication system according to the second embodiment enables transmission of the CQI and data in the radio resource for data transmission of a timing different from the timing of the radio resource of the periodic CQI that has been allocated in advance. Then, in the wireless communication system according to the second embodiment, the CQI transmission in the radio resource of the periodic CQI is skipped once. Thus, the wireless communication system according to the second embodiment enables a reduction in the number of transmissions by securing the radio resource of a different timing for data transmission, even when it is difficult to secure the radio resource of the timing of the radio resource for the periodic CQI. Therefore, the wireless communication system according to the second embodiment can utilize the reference technology described above without any problem even in a case having a problem in application.

Figure 8:
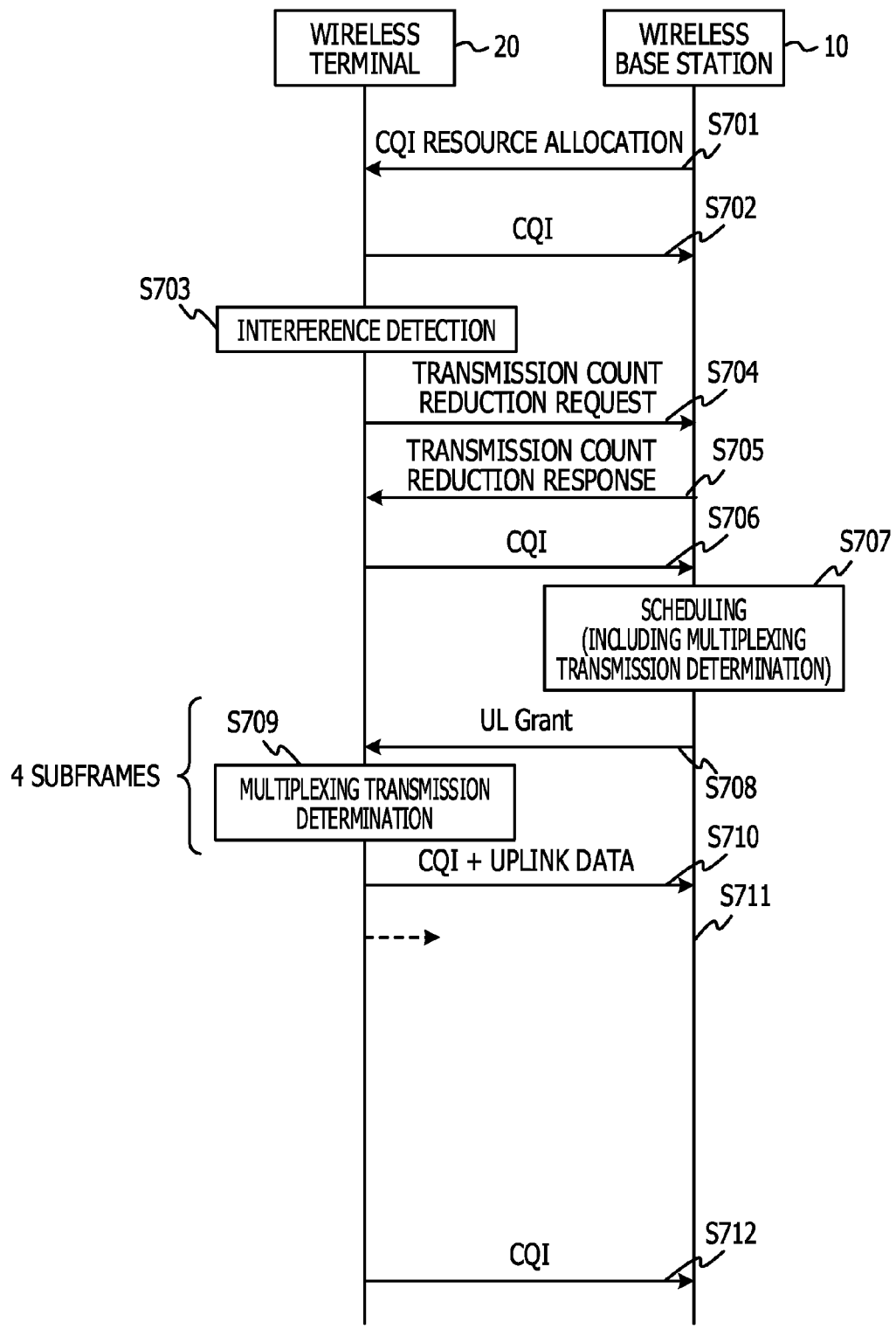
FIG. 8 is a diagram illustrating an example of a processing sequence of periodic CQI and uplink data transmission according to a modification of the second embodiment.

However, similar to the modification described in the first embodiment, it is possible to configure a modification of the second embodiment. FIG. 8 illustrates a processing sequence of a wireless communication system according to the modification of the second embodiment. S701 and 702 of FIG. 8 are processes corresponding to S601 and S602 of FIG. 7. S703 to S705 of FIG. 8 are processes corresponding to S502 to S504 of FIG. 6. S706 to S712 of FIG. 8 are processes corresponding to S603 to S609 of FIG. 7. Here, the details will be omitted.

In addition, as described above, examples of the uplink control information which is periodically transmitted in LTE include a PMI and RI in addition to the CQI. Although the above description has been made based on the periodic CQI as an example, of course, it is also applicable to the periodic PMI and the periodic RI.

Further, in FIGS. 7 and 8, the CQI which is information to be transmitted based on the periodic radio resource has been described as an example of an object to be multiplexed with the uplink data (an object to be transmitted in the same subframe as that of the uplink data and), but the object to be multiplexed is not limited thereto. For example, it is possible to use a scheduling request (SR) as an example of the object to be multiplexed with the uplink data. However, the SR is transmitted based on the periodic radio resource, but the SR is different from the periodic CQI, and is not transmitted in all of the cycles. Therefore, only when the SR has to be transmitted, the wireless terminal 20 transmits the SR and the uplink data while multiplexing them with the PUSCH. Further, uplink data communication to which semi-persistent scheduling (SPS) is applied can be an example of the object to be multiplexed with the uplink data. In the uplink data communication to which the SPS is applied, mainly, audio data of real-time communication is transmitted from the wireless terminal towards the wireless base station, and normally, it is transmitted, for example, in 20 ms cycles. In the SPS, the radio resource is periodically allocated in advance for the transmission of such audio data. In addition, as described above, whereas the periodic CQI alone is control information transmitted through the PUCCH, the periodic CQI in the uplink data communication to which the SPS is applied is originally data information transmitted through the PUSCH, but it can be multiplexed with the uplink data to the PUSCH in the same manner (here, the details will be omitted).

[Modification of Object of Transmission Stop]

Here, a description will be made regarding a modification of an object of transmission stop of the second embodiment. In the second embodiment, the first periodic CQI (for example, S608 of FIG. 7) following the subframe (for example, S607 of FIG. 7) for performing the multiplexing transmission of the uplink data and the CQI is the object of transmission stop. In contrast, in the modification, a periodic CQI having a minimum timing difference with the subframe for performing the multiplexing transmission of the uplink data and the CQI (however, limited to that following the resource allocation for the subframe for performing the multiplexing transmission of the uplink data and the CQI) is the object of transmission stop.

Figure 9:
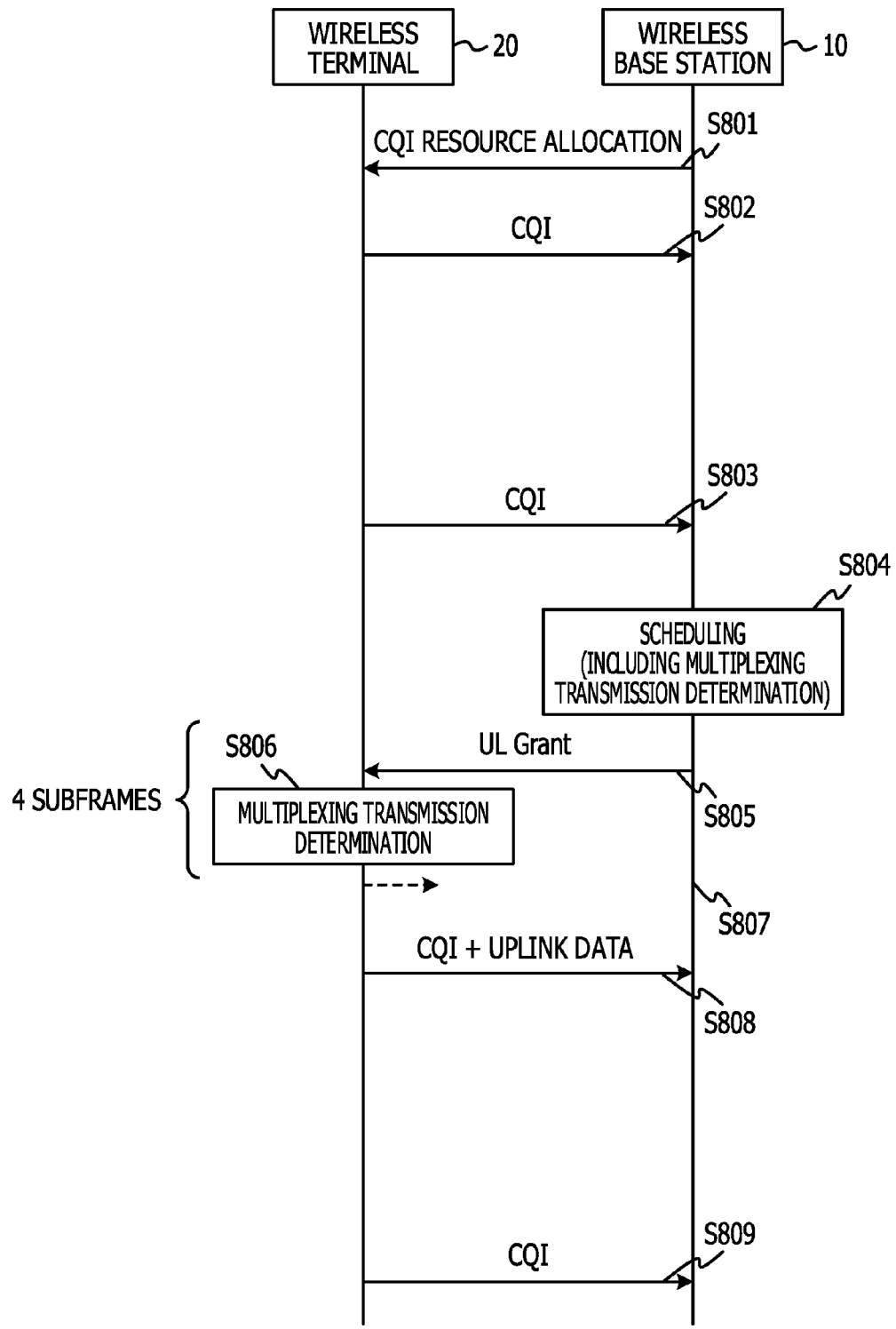
FIG. 9 is a diagram illustrating an example of a processing sequence of periodic CQI and uplink data transmission according to a modification of multiplexing of the periodic CQI and the uplink data.

FIG. 9 illustrates an example of a processing sequence in a wireless communication system according to the modification of the second embodiment. The modification illustrated in FIG. 9 is similar to the second embodiment illustrated in FIG. 7 in many parts. Hereinafter, the modification will be described focusing on parts different from the second embodiment.

S801 to S803 of FIG. 9 are processes corresponding to S601 to S603 of FIG. 7. Here, the details will be omitted.

In S804 of FIG. 9, the wireless base station 10 performs the scheduling of the uplink radio resource for the uplink data transmission for the wireless terminal 20. In S804, similar to S604 of FIG. 7 according to the second embodiment, the wireless base station 10 determines whether or not to perform the multiplexing transmission of the uplink data and the CQI based on the predetermined rule, and determines the size of the radio resource to be allocated to the wireless terminal 20 based on the determination result. Here, in the second embodiment, a predetermined rule is a determination of whether or not the timing difference between the subframe for the wireless terminal 20 transmitting at least uplink data and the subframe for transmitting a first periodic CQI following the subframe for the wireless terminal 20 is equal to or less than a predetermined value. In contrast, in the modification, a predetermined rule is determination of whether or not a timing difference between the subframe for the wireless terminal 20 transmitting at least uplink data and one of the subframes for transmitting periodic CQIs before and after the subframe for the wireless terminal 20 (here, limited to that following the UL grant of S805) is equal to or less than a predetermined value.

In FIG. 9, for example, it is assumed that a timing difference between the subframe for the wireless terminal 20 transmitting at least uplink data and the subframe for transmitting a periodic CQI preceding to the subframe for the wireless terminal 20 (that following the UL grant of S805) is equal to or less than a predetermined value. In this case, since the predetermined rule is satisfied, in S804, the wireless base station 10 determines to cause the uplink data and the CQI to be multiplexed and transmitted.

S805 to S806 of FIG. 9 is a process corresponding to S605 to S606 of FIG. 7. However, in S806, the wireless terminal 20 determines whether or not to perform multiplexing transmission of the uplink data and the periodic CQI, based on the predetermined rule according to the modification (see the description regarding S804).

In S807 of FIG. 9, the wireless terminal 20 stops the transmission of the periodic CQI, based on the determination result of S806. The periodic CQI of S807 corresponds to a periodic CQI prior to the subframe for multiplexing transmitting the uplink data and the CQI and after the UL grant of S805. Thus, the wireless terminal 20 skips the transmission of the periodic CQI once.

Next, in S808 of FIG. 9, the wireless terminal 20 performs the multiplexing transmission of the uplink data and the CQI, based on the determination result of S806. S808 is a process corresponding to S607 of FIG. 7. Last, in S809 of FIG. 9, the wireless terminal 20 transmits the periodic CQI. Thus, it is possible to suppress a reduction in the effect of the adaptive modulation coding based on an increase in the transmission interval of the CQI, by transmitting the CQI in S808, instead of skipping the transmission of the periodic CQI once in S807.

According to the wireless communication system of the modification of the second embodiment described based on FIG. 9, it is considered to be possible to suppress the variation in the transmission interval of the CQI, as compared to the second embodiment illustrated in FIG. 7.

Here, in the case where the timing of each subframe is as illustrated in FIG. 9, applying the second embodiment is considered. At this time, when "permitted" is determined from the multiplexing transmission determination of S806, the wireless terminal 20 transmits the periodic CQI in S807, performs the multiplexing transmission of the CQI and the uplink data in S808, and stops the transmission of the periodic CQI in S809. In this case, whereas the number of transmissions is reduced but the transmission interval of the CQI is shortened in S807 and S808, the transmission interval between S808 and the next periodic CQI transmission (not illustrated) becomes about twice as large as the normal interval. If the CQI transmission interval varies in this manner, it is not preferable because the effect of the adaptive modulation coding is not sufficiently exhibited. In such cases, applying the modification enables suppression in the variation of the transmission interval of the CQI as illustrated in FIG. 9, and thus it is considered to be preferable.

[Other Modifications]

Here, the other modifications will be described.

First, a description will be made regarding a modification in which the wireless base station 10 instructs the necessity of multiplexing transmission to the wireless terminal 20. In the first embodiment or the second embodiment which is described above, the second information (the case of the first embodiment) or the uplink data (the case of the second embodiment) transmitted by the wireless terminal 20 is handled without distinction each time. Further, even in the respective modifications of the first embodiment or the second embodiment, the second information or the uplink data transmitted by the wireless terminal 20 is handled without distinction each time, within a predetermined period after transmitting and receiving the transmission count reduction response. In contrast, in the modification, the wireless base station 10 instructs the necessity of multiplexing transmission to the wireless terminal 20, for every second information or uplink data each time.

Specifically, the wireless base station 10 can transmit the necessity of the multiplexing transmission to the wireless terminal 20 while storing the necessity in the second resource allocation (the case of the first embodiment) or the UL grant (the case of the second embodiment). With respect to the UL grant, for example, a new dedicated area (one bit) for storing the necessity of the multiplexing transmission may be provided in the UL grant, or the necessity of the multiplexing transmission may be stored by using one or more existing areas included in the UL grant. In all cases, if the second resource allocation or the UL grant is received, the wireless terminal 20 refers to the necessity of the multiplexing transmission that is included in the second resource allocation or the UL grant. Then, if the value of the necessity of the multiplexing transmission that is included in the second resource allocation or the UL grant is "needed", the wireless terminal 20 performs the multiplexing transmission of the second information corresponding to the two resource allocations or the uplink data corresponding to the UL grant with the first information or the CQI. Meanwhile, if the value of the necessity of the multiplexing transmission that is included in the second resource allocation or the UL grant is "unneeded", the wireless terminal 20 does not perform the multiplexing transmission of the second information corresponding to the two resource allocations or the uplink data corresponding to the UL grant with the first information or the CQI. By doing so, it is possible to switch between performing and not performing the multiplexing transmission, for every second information or uplink data.

Further, in the above modification, although the wireless base station 10 instructs the necessity (whether) of the multiplexing transmission to the wireless terminal 20, it is possible to instruct a method or the like of the multiplexing transmission. As an example, it is assumed that a first method of the multiplexing transmission is a method illustrated in FIG. 7 and a second method is a method illustrated in FIG. 9. At this time, the wireless base station 10 instructs whether to perform the multiplexing transmission in the first method or to perform the multiplexing transmission in the second method, or not to perform the multiplexing transmission, to the wireless terminal 20 for each piece of uplink data.

Next, a description will be made regarding a modification of the transmission count reduction request. In each modification of the first embodiment or the second embodiment which is described above, when the wireless terminal 20 detects the occurrence of interference in the reception in second wireless communication (wireless communication based on wireless communication schemes other than LTE-A) caused by the transmission in the first wireless communication (wireless communication based on LTE-A), the wireless terminal 20 transmits the transmission count reduction request to the wireless base station 10. In contrast, in the modification, it is assumed that the wireless terminal 20 transmits the transmission count reduction request to the wireless base station 10, in a predetermined case where it has to suppress the power consumption in the wireless terminal 20. This is because the reduction in the number of transmissions also includes the aspect of a reduction in power consumption in the wireless terminal, in addition to the aspect of suppression of interference in other wireless communication.

More specifically, for example, if the remaining amount of the battery provided in the wireless terminal 20 is a predetermined value or less, the wireless terminal 20 can transmit the transmission count reduction request to the wireless base station 10. Further, when power saving is particularly desired in the wireless terminal 20 such as a machine type communication (MTC) device, the wireless terminal 20 transmits the transmission count reduction request to the wireless base station 10. By doing so, when the wireless terminal 20 intends to reduce the power consumption, it is possible to suppress the power consumption by reducing the number of transmissions. Further, it is also possible to simultaneously limit the subframe where data transmission occurs in the downlink wireless section in order to increase the power consumption reducing effect of the wireless terminal. In other words, it is possible to reduce the power that the wireless terminal spends for the reception process of the downlink signal, by limiting the downlink subframe in which it is possible that the wireless base station may transmit the data signal and the control signal to the wireless terminal for which the transmission count reduction request is allowed.

[Network Configuration of Wireless Communication System in Each Embodiment]

Figure 10:
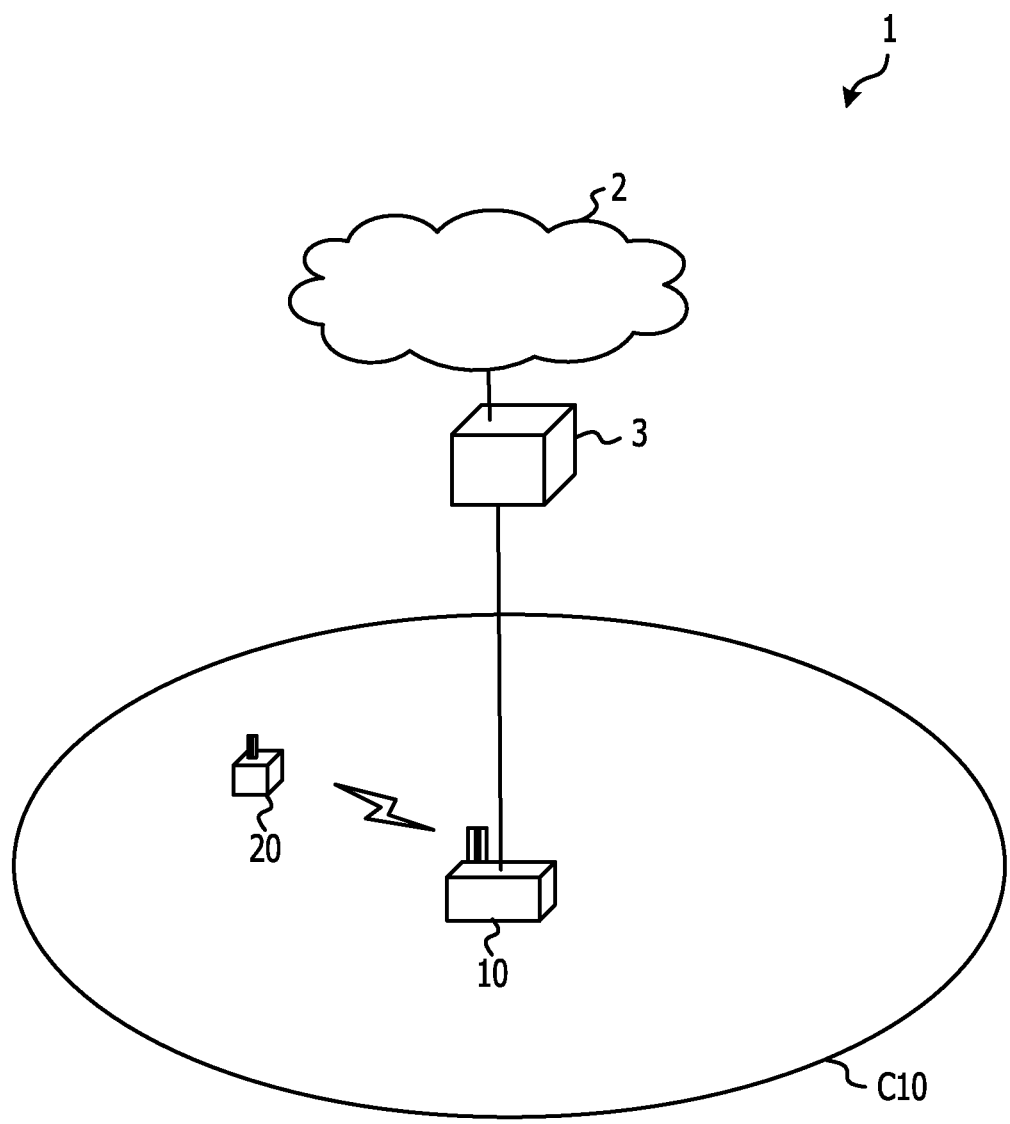
FIG. 10 is a diagram illustrating a configuration of a wireless communication system according to each embodiment.

Next, a description will be made regarding the network configuration of the wireless communication system 1 of each embodiment and each modification, based on FIG. 10. As illustrated in FIG. 10, the wireless communication system 1 includes a wireless base station 10 and a wireless terminal 20. The wireless base station 10 forms a cell C10. The wireless terminal 20 is present in the cell C10. In addition, it is noted that the wireless base station 10 and the wireless terminal 20 are collectively referred to as "a wireless station" in the present embodiment.

The wireless base station 10 is connected to the network apparatus 3 through wired connection, and the network apparatus 3 is connected to the network 2 through wired connection. The wireless base station 10 is provided so as to be able to transmit and receive the data and the control information to and from the other wireless base stations, through the network apparatus 3 and the network 2.

The wireless communication function and the digital signal processing and control function of the wireless base station 10 and the wireless terminal 20 may be separated and provided in separate apparatuses. In this case, an apparatus equipped with the wireless communication function is referred to as a remote radio head (RRH), and an apparatus equipped with a digital signal processing and control function is referred to as a base band unit (BBU). The RRH may be provided separated from the BBU, and they may be connected in a wired manner by using an optical fiber. Further, the wireless base station 10 may be in different sizes, in addition to a small wireless base station such as a macro wireless base station and a pico wireless base station (including a micro wireless base station, a femto wireless base station, and the like). Further, when a relay station is used which relays the wireless communication (transmission and reception, and the control thereof of the wireless terminal 20) between the wireless base station 10 and the wireless terminal 20, the relay station also may be included in the wireless base station 10 in the embodiment.

Meanwhile, the wireless terminal 20 communicates with the wireless base station 10 in the first wireless communication. Further, the wireless terminal 20 communicates with an access point or a communication apparatus other than the wireless base station 10 in the second wireless communication. Examples of the first wireless communication are LTE or LTE-A. Further, as the second wireless communication, it is possible to use, for example, a wireless LAN such as WiFi (registered trademark) and WiMAX (registered trademark), Bluetooth (registered trademark), GPS, Zigbee (registered trademark), global system for mobile communications (GSM, registered trademark), universal mobile telecommunications system (UMTS), and the like.

The first wireless communication and the second wireless communication are performed by using the same or similar frequency bandwidth. For example, a case is assumed a case where a frequency bandwidth group prepared for the first wireless communication and a frequency bandwidth group prepared for the second wireless communication are adjacent to each other or a case is assumed where the first wireless communication and second wireless communication share the same frequency bandwidth group.

The wireless terminal 20 may be a mobile phone, a smartphone, a personal digital assistant (PDA), a personal computer, and a wireless terminal such as various devices and equipment having a wireless communication function (such as a sensor device). Further, when a relay station is used which relays the wireless communication (transmission and reception, and the control thereof of the wireless base station 10) between the wireless base station 10 and the wireless terminal 20, the relay station also may be included in the wireless terminal 20 in the embodiment.

The network apparatus 3 includes, for example, a communication unit and a control unit, and respective components are connected in such a manner that the input and output of the signals and data are possible unidirectionally or bidirectionally. The network apparatus 3 is implemented by, for example, a gateway. As the hardware configuration of the network apparatus 3, for example, the communication unit is implemented by an interface circuit, and the control unit is implemented by a processor and a memory.

In addition, specific aspects of the dispersion and integration of the respective components of the wireless base station 10 and the wireless terminal 20 are not limited to the aspect of the first embodiment, and can be configured by functionally or physically dispersing and integrating the entirety or a part of the respective components, depending on various loads or use conditions, in arbitrary units. For example, a memory may be connected as an external device of the wireless base station 10 and the wireless terminal 20, through a network or a cable.

[Functional Configurations of Respective Apparatuses in Wireless Communication Systems in Respective Embodiments]

Next, a description will be made regarding functional configurations of respective apparatuses in the wireless communication systems in the respective embodiments and the respective modifications, based on FIG. 11 to FIG. 12.

Figure 11:
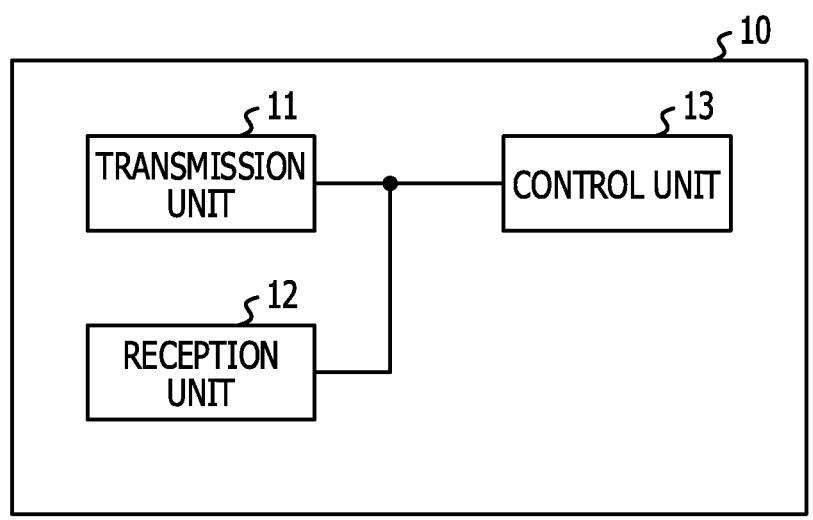
FIG. 11 is a functional block diagram illustrating a configuration of a wireless base station according to each embodiment.

FIG. 11 is a functional block diagram illustrating a configuration of the wireless base station 10. As illustrated in FIG. 11, the wireless base station 10 includes a transmission unit 11, a reception unit 12, and a control unit 13. The respective components are connected in such a manner that the input and output of the signals and data are possible unidirectionally or bidirectionally.

The transmission unit 11 transmits data signals and control signals through the antenna in the first wireless communication. In addition, the antenna may be used for both transmission and reception. The transmission unit 11 transmits the downlink signal, through, for example, the downlink data channel and the control channel. The downlink physical data channel includes, for example, an individual data channel, that is, a physical downlink shared channel (PDSCH). Further, the downlink physical control channel includes, for example, an individual control channel, that is, a physical downlink control channel (PDCCH). Examples of a signal to be transmitted include L1/L2 control signals transmitted to the wireless terminal 20 in a connection state on the individual control channels, a user data signal transmitted to the wireless terminal 20 in a connection state on the individual data channel, and a radio resource control (RRC) signaling. Further, an example of the signals to be transmitted includes a reference signal used for channel estimation or demodulation.

Specific examples of the signal to be transmitted by the transmission unit 11 include respective signals to be transmitted by respective wireless base station in FIGS. 5 to 9. Specifically, the transmission unit 11 can transmit the first resource allocation in FIGS. 5 and 6, or the CQI resource allocation in FIGS. 7 to 9 through, for example, the PDSCH, by the RRC signaling. The transmission unit 11 can transmit the second resource allocation in FIGS. 5 and 6, or the UL grant in FIGS. 7 to 9, as the control signal through, for example, the PDCCH. The transmission unit 11 can transmit the transmission reduction response in FIG. 6 or FIG. 8, by the RRC signaling through, for example, the PDSCH.

The reception unit 12 receives the data signal and the control signal that are transmitted from the wireless terminal 20 in first wireless communication, through the antenna. The reception unit 12 receives the uplink signal, through, for example, the uplink data channel and the control channel. The uplink physical data channel includes, for example, the individual data channel, that is, a physical uplink shared channel (PUSCH). Further, the uplink physical control channel includes, for example, the individual control channel, that is, a physical uplink control channel (PUCCH). Examples of a signal to be received include L1/L2 control signals transmitted from the wireless terminal 20 in a connection state on the individual control channels, a user data signal transmitted from the wireless terminal 20 in a connection state on the individual data channel, and a radio resource control (RRC) signaling. Further, an example of the signals to be received includes a reference signal used for channel estimation or demodulation.

Specific examples of the signal to be received by the reception unit 12 include respective signals to be received by respective wireless base stations 10 in FIGS. 5 to 9. Specifically, the reception unit 12 can receive the first information and the second information in FIGS. 5 and 6 or the CQI and the uplink data which are multiplexed in FIGS. 7 to 9, through, for example, the PUSCH. The reception unit 12 can receive the CQI in FIGS. 7 to 9, for example, as the control signal through the PUCCH. The reception unit 12 can receive the transmission reduction request in FIG. 6 or FIG. 8, through, for example, the PUSCH, by the RRC signaling.

The control unit 13 outputs data and control information to be transmitted, to the transmission unit 11. The control unit 13 receives the data and the control information that have been received, from the reception unit 12. The control unit 13 obtains the data and the control information from the network apparatus 3 and other wireless base stations, through a wired connection or wireless connection. The control unit 13 performs various types of control relating to various types of transmission signals that the transmission unit 11 transmits and various types of reception signals that the reception unit 12 receives, in addition thereto.

In FIGS. 5 to 9, specific examples of a process that the control unit 13 controls include various processes carried out by each wireless base station 10. In FIGS. 5 and 6, the control unit 13 controls respective processes such as transmission of the resource allocation, transmission of the second resource allocation, reception of the first information and the second information, stopping of the reception using the first resource, reception of the transmission reduction request, and transmission of the transmission reduction response. In FIGS. 7 to 9, the control unit 13 controls respective processes such as transmission of the CQI resource allocation, reception of the CQI, scheduling (including multiplexing determination), transmission of the UL grant, reception of the CQI and the uplink data, stopping of the CQI reception, reception of the transmission reduction request, and transmission of the transmission reduction response.

Figure 12:
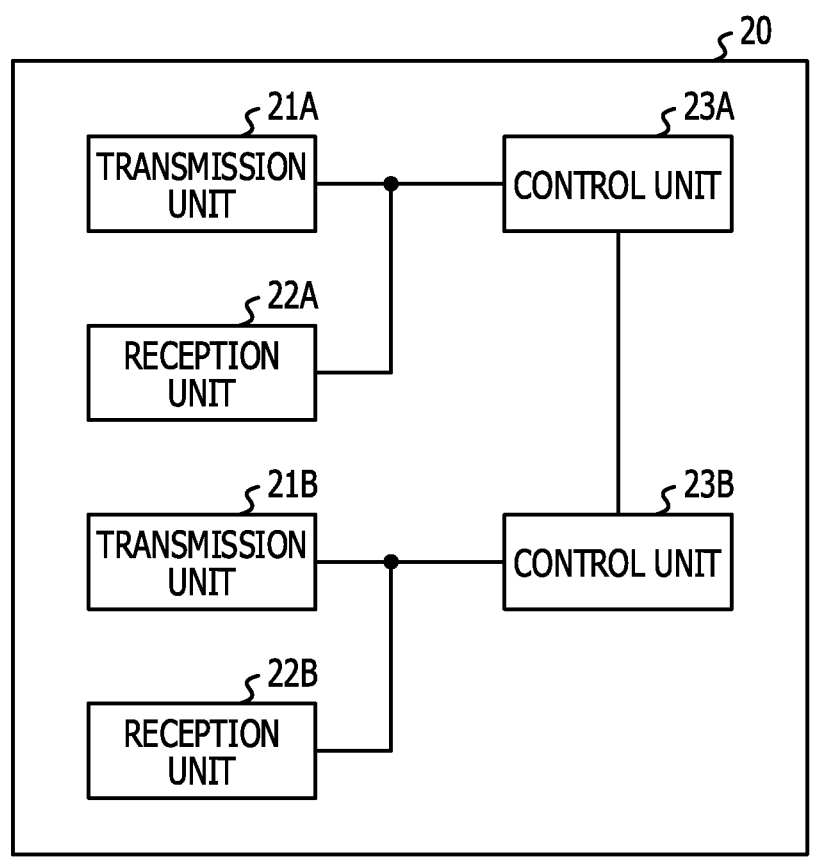
FIG. 12 is a functional block diagram illustrating a configuration of a wireless terminal according to each embodiment.

FIG. 12 is a functional block diagram illustrating a configuration of the wireless terminal 20. As illustrated in FIG. 12, the wireless terminal 20 includes transmission units 21A and 21B, reception units 22A and 22B, and control units 23A and 23B. The respective components are connected in such a manner that the input and output of the signals and data are possible unidirectionally or bidirectionally.

The transmission unit 21A transmits data signals and control signals through the antenna in the first wireless communication. In addition, the antenna may be used for both transmission and reception. The transmission unit 21A transmits the uplink signal, through, for example, the uplink data channel and the control channel. The uplink physical data channel includes, for example, an individual data channel PUSCH. Further, the uplink physical control channel includes, for example, an individual control channel PUCCH. Examples of a signal to be transmitted include L1/L2 control signals transmitted to the wireless base station 10 in a connection state on the individual control channels, a user data signal transmitted to the wireless base station 10 in a connection state on the individual data channel, and a radio resource control (RRC) signaling. Further, an example of the signals to be transmitted includes a reference signal used for channel estimation or demodulation.

Specific examples of the signal to be transmitted by the transmission unit 21A include respective signals to be transmitted by respective wireless terminal 20 in FIGS. 5 to 9. Specifically, the transmission unit 21A can transmit the first information and the second information in FIGS. 5 and 6, or the CQI and the uplink data which are multiplexed in FIGS. 7 to 9 through, for example, the PUSCH. The transmission unit 21A can transmit the CQI in FIGS. 7 to 9, as the control signal through, for example, the PUCCH. The transmission unit 21A can transmit the transmission reduction request in FIG. 6 or FIG. 9, by the RRC signaling through, for example, the PUSCH.

The reception unit 22A receives the data signal and the control signal that are transmitted from the wireless base station 10 in first wireless communication, through the antenna. The reception unit 22A receives the downlink signal, through, for example, the downlink data channel and the control channel. The downlink physical data channel includes, for example, the individual data channel PDSCH. Further, the downlink physical control channel includes, for example, the individual control channel PDCCH. Examples of a signal to be received include L1/L2 control signals transmitted from the wireless base station 10 in a connection state on the individual control channels, a user data signal transmitted from the wireless base station 10 in a connection state on the individual data channel, and radio resource control (RRC) signaling. Further, an example of the signals to be received includes a reference signal used for channel estimation or demodulation.

Specific examples of the signal to be received by the reception unit 22A include respective signals to be received by respective wireless terminal 20 in FIGS. 5 to 9. Specifically, the reception unit 22A can receive the first resource allocation in FIGS. 5 and 6 or the CQI resource allocation of FIGS. 7 to 9, through, for example, the PDSCH, by the RRC signaling. The reception unit 22A can receive the second resource allocation in FIGS. 5 and 6 or the UL grant of FIGS. 7 to 9, for example, as the control signal through the PDCCH. The reception unit 22A can receive the reception reduction response in FIG. 6 or FIG. 8, through, for example, the PDSCH, by the RRC signaling.

The control unit 23A outputs data and control information to be transmitted, to the transmission unit 21A. The control unit 23A receives the data and the control information that have been received, from the reception unit 22A. The control unit 23A performs various types of control relating to various types of transmission signals that the transmission unit 21A transmits and various types of reception signals that the reception unit 22A receives, in addition thereto.

In FIGS. 5 to 9, specific examples of a process that the control unit 23A controls include various processes carried out by each wireless terminal 20. In FIGS. 5 and 6, the control unit 23A controls respective processes such as reception of the resource allocation, reception of the second resource allocation, transmission of the first information and the second information, stopping of the transmission using the first resource, transmission of the transmission reduction request, and reception of the transmission reduction response. In FIGS. 7 to 9, the control unit 23A controls respective processes such as reception of the CQI resource allocation, transmission of the CQI, reception of the UL grant, multiplexing determination, transmission of the CQI and the uplink data, stop of the CQI transmission, interference detection, transmission of the transmission reduction request, and reception of the transmission reduction response.

The transmission unit 21B transmits the data signal and the control signal through the antenna in the second wireless communication. In addition, the antenna may be used for both the transmission and the reception.

The reception unit 22B receives the data signal and the control signal which are transmitted from the wireless base station through the antenna in the second wireless communication.

The control unit 23B outputs the data and the control information to be transmitted, to the transmission unit 21. Further, the control unit 23 receives the data and the control information that have been received, from the reception unit 22.

The control unit 23B detects, for example, the occurrence of interference in the second wireless communication, based on the error characteristics of the reception signal on the second wireless communication side, during the operation of the first wireless communication and the second wireless communication (or determines the degradation of the communication performance in the second wireless communication).

The control unit 23B notifies the control unit 23A of the measured reception signal level. The control unit 23B may determine the degradation of the communication performance in the second wireless communication, based on the measured reception signal level, and notify the control unit 23A of the determination result.

[Hardware Configurations of Respective Devices in Wireless Communication Systems of Respective Embodiments]

Based on FIG. 13 and FIG. 14, the hardware configurations of respective devices in the wireless communication systems of respective embodiments and respective modifications will be described.

Figure 13:
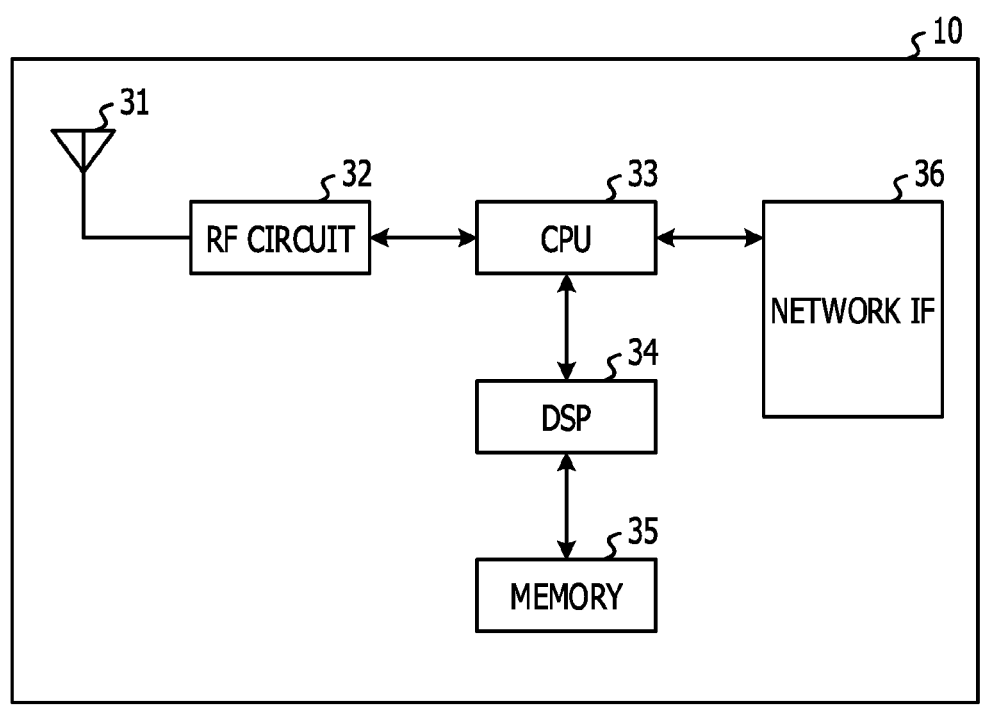
FIG. 13 is a diagram illustrating a hardware configuration of the wireless base station according to each embodiment.

FIG. 13 is a diagram illustrating a hardware configuration of the wireless base station 10. As illustrated in FIG. 13, the wireless base station 10 includes, for example, a radio frequency (RF) circuit 32 including an antenna 31, a central processing unit (CPU) 33, a digital signal processor (DSP) 34, a memory 35, and a network interface (IF) 36, as hardware components. The CPU is connected in such a manner that the input and output of various types of signals and data are possible through a bus. The memory 35 includes, for example, at least one of a random access memory (RAM) such as a synchronous dynamic random access memory (SDRAM), a read only memory (ROM), and a flash memory, and stores programs, control information, and data. The transmission unit 11 and the reception unit 12 are implemented by, for example, the RF circuit 32, or the antenna 31 and the RF circuit 32. The control unit 13 is implemented by, for example, the CPU 33, the DSP 34, the memory 35, and a digital electronic circuit which is not illustrated. Examples of the digital electronic circuit include an application specific integrated circuit (ASIC), a field-programming gate array (FPGA), a large scale integration (LSI), and the like.

Figure 14:
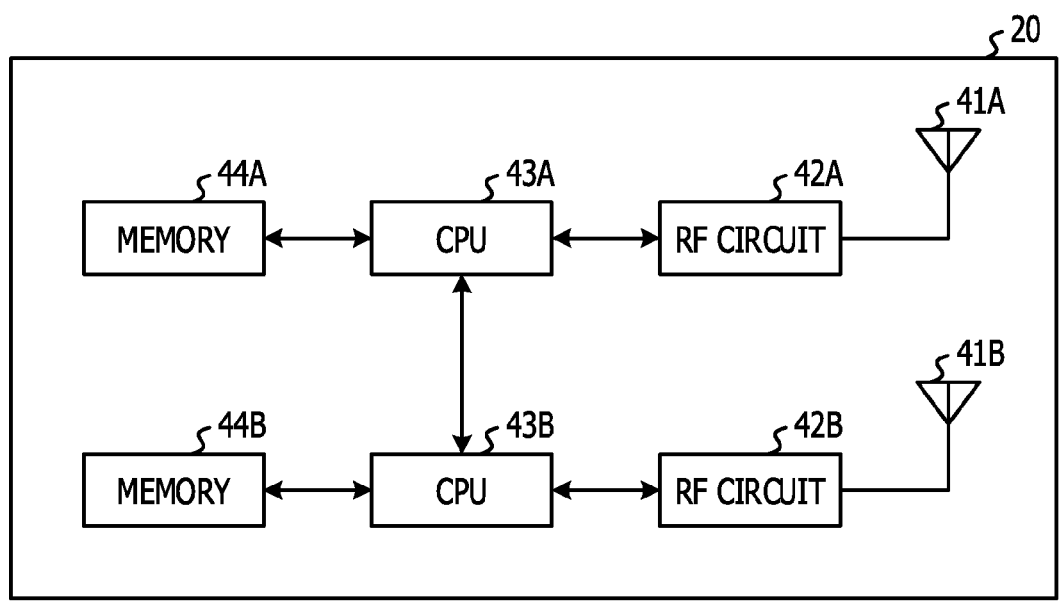
FIG. 14 is a diagram illustrating a hardware configuration of the wireless terminal according to each embodiment.

FIG. 14 is a diagram illustrating a hardware configuration of the wireless terminal 20. As illustrated in FIG. 14, the wireless terminal 20 includes, for example, RF circuits 42A and 42B respectively equipped with antennas 41A and 41B, CPU 43A and 43B, and memories 44A and 44B, as hardware components. Further, the wireless terminal 20 may include a display device such as a liquid crystal display (LCD) connected to the CPU 43A and 43B. The memories 44A and 44B includes, for example, at least one of a RAM such as an SRAM, a ROM, and a flash memory, and stores programs, control information, and data. The transmission unit 21A and the reception unit 22A are implemented by, for example, the RF circuit 42A, or the antenna 41A and the RF circuit 42A. The control unit 23A is implemented by, for example, the CPU 43A, the memory 44A, and a digital electronic circuit which is not illustrated. Examples of the digital electronic circuit include an ASIC, an FPGA, an LSI, and the like. Similarly, the transmission unit 21B and the reception unit 22B are implemented by, for example, the RF circuit 42B, or the antenna 41B and the RF circuit 42B. The control unit 23B is implemented by, for example, the CPU 43B, the memory 44B, and a digital electronic circuit which is not illustrated.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that various changes, substitutions, and alterations could be made hereto without departing from the spirit and scope of the invention.

What is claimed is:

1. A wireless communication apparatus that performs transmission based on a radio resource that is allocated from another wireless communication apparatus, the wireless communication apparatus comprising:
   a memory; and
   a processor coupled to the memory and configured to, after a first radio resource for transmitting first information has been allocated, before transmitting the first information based on the first radio resource, when a second radio resource is allocated that is a radio resource of a timing different from a timing of the first radio resource and is a radio resource for transmitting second information, perform a transmission process of transmitting the first information and the second information based on the second radio resource and of not using the first radio resource for the transmission.

2. The wireless communication apparatus according to claim 1,
   wherein the first radio resource is a radio resource allocated after the second radio resource is allocated, and is a radio resource whose timing difference with the second radio resource is smallest among periodic radio resources.

3. The wireless communication apparatus according to claim 2,
   wherein the first radio resource is a radio resource allocated after the second radio resource is allocated, and is a radio resource whose timing difference with the second radio resource is equal to or less than a predetermined value among the periodic radio resources.

4. The wireless communication apparatus according to claim 2,
   wherein the periodic radio resources are radio resources for transmitting variable information that varies in accordance with transmission timing.

5. The wireless communication apparatus according to claim 4,
   wherein the variable information is information indicating reception quality that is measured by the wireless communication apparatus based on the transmission timing.

6. The wireless communication apparatus according to claim 1,
   wherein the processor is configured to perform the transmission process when an instruction signal is received from the another wireless communication apparatus.

7. A wireless communication apparatus comprising:
   a memory; and
   a processor coupled to the memory and configured to:
   allocate a radio resource for another wireless communication apparatus to transmit information, and
   after allocating a first radio resource for transmitting first information, before receiving the first information based on the first radio resource, when allocating a second radio resource that is a radio resource of a timing different from a timing of the first radio resource and is a radio resource for transmitting second information, perform a reception process of receiving the first information and the second information based on the second radio resource and of not performing reception based on the first radio resource.

8. The wireless communication apparatus according to claim 7,
wherein the first radio resource is a radio resource allocated after the second radio resource is allocated, and is a radio resource whose timing difference with the second radio resource is smallest among periodic radio resources.

9. The wireless communication apparatus according to claim 8,
wherein the first radio resource is a radio resource allocated after the second radio resource is allocated, and is a radio resource whose timing difference with the second radio resource is equal to or less than a predetermined value among the periodic radio resources.

10. The wireless communication apparatus according to claim 8,
wherein the periodic radio resources are radio resources for transmitting variable information that varies in accordance with transmission timing.

11. The wireless communication apparatus according to claim 10,
wherein the variable information is information indicating reception quality that is measured by the wireless communication apparatus based on the transmission timing.

12. The wireless communication apparatus according to claim 7, wherein
the processor is configured to perform the reception process when an instruction signal is transmitted to the another wireless communication apparatus.

13. A wireless communication method in a wireless communication apparatus that performs transmission based on a radio resource that is allocated from another wireless communication apparatus, the wireless communication method comprising:
after a first radio resource for transmitting first information has been allocated, before transmitting the first information based on the first radio resource, when a second radio resource is allocated that is a radio resource of a timing different from a timing of the first radio resource and is a radio resource for transmitting second information, performing a transmission process of transmitting the first information and the second information based on the second radio resource and of not using the first radio resource for the transmission.

14. A wireless communication method comprising:
allocating a radio resource for another wireless communication apparatus to transmit information; and
after allocating a first radio resource for transmitting first information to another wireless communication apparatus, before receiving the first information based on the first radio resource, when allocating a second radio resource that is a radio resource of a timing different from a timing of the first radio resource and is a radio resource for transmitting second information, performing a reception process of receiving the first information and the second information based on the second radio resource and of not performing reception based on the first radio resource.

* * * * *